US010860619B2

(12) United States Patent
Rezaei et al.

(10) Patent No.: US 10,860,619 B2
(45) Date of Patent: *Dec. 8, 2020

(54) CONCEPT-LEVEL USER INTENT PROFILE EXTRACTION AND APPLICATIONS

(71) Applicant: NETSEER, INC., Menlo Park, CA (US)

(72) Inventors: Behnam A. Rezaei, Santa Clara, CA (US); Vwani P. Roychowdhury, Los Angeles, CA (US); Sanjiv Ghate, Sunnyvale, CA (US); Nima Khajehnouri, Los Angeles, CA (US); Riccardo Boscolo, Culver City, CA (US); John Mracek, Los Altos, CA (US)

(73) Assignee: Netseer, Inc., Menlo Park, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 16/430,742

(22) Filed: Jun. 4, 2019

(65) Prior Publication Data

US 2019/0370270 A1 Dec. 5, 2019

Related U.S. Application Data

(63) Continuation of application No. 14/017,123, filed on Sep. 3, 2013, now Pat. No. 10,311,085.

(Continued)

(51) Int. Cl.
*G06Q 30/00* (2012.01)
*G06F 16/28* (2019.01)
(Continued)

(52) U.S. Cl.
CPC ....... *G06F 16/285* (2019.01); *G06Q 30/0251* (2013.01); *G06Q 30/0255* (2013.01);
(Continued)

(58) Field of Classification Search
CPC .............. G06F 16/285; G06Q 30/0269; G06Q 30/0271; G06Q 30/0256; G06Q 50/01; G06Q 30/0251; G06Q 30/0255
See application file for complete search history.

(56) References Cited

U.S. PATENT DOCUMENTS 5,581,764 A    12/1996 Fitzgerald et al.
5,721,910 A    2/1998 Unger et al.
(Continued)

FOREIGN PATENT DOCUMENTS

CN    101278257 A    10/2008
EP    1891509 A2    2/2008
(Continued)

OTHER PUBLICATIONS

Bagrow, J.P. et al., "A Local Method for Detecting Communities," Physical Review E, vol. 72, No. 4, 2005, 046108, pp. 1-16.
(Continued)

*Primary Examiner* — Luis A Brown

(57) ABSTRACT

Methods and systems for extracting intents and intent profiles of users, as inferred from the different activities they execute and data they share on social media sites, and then (i) monetization of such intents via targeted advertisements, and (ii) enhancement of user experience via organization of their contact lists and conversations and posts based on their content and conceptual context.

20 Claims, 9 Drawing Sheets

Related U.S. Application Data

(60) Provisional application No. 61/695,877, filed on Aug. 31, 2012.

(51) Int. Cl.
  *G06Q 30/02* (2012.01)
  *G06Q 50/00* (2012.01)

(52) U.S. Cl.
  CPC ..... *G06Q 30/0256* (2013.01); *G06Q 30/0269* (2013.01); *G06Q 30/0271* (2013.01); *G06Q 50/01* (2013.01)

(56) References Cited

U.S. PATENT DOCUMENTS

| | | |
|---|---|---|
| 5,956,708 A | 9/1999 | Dyko et al. |
| 6,038,560 A | 3/2000 | Wical |
| 6,098,064 A | 8/2000 | Pirolli et al. |
| 6,233,575 B1 | 5/2001 | Agrawal et al. |
| 6,242,273 B1 | 6/2001 | Goodwin et al. |
| 6,339,767 B1 | 1/2002 | Rivette et al. |
| 6,397,682 B2 | 6/2002 | Kumar et al. |
| 6,446,061 B1 | 9/2002 | Doerre et al. |
| 6,544,357 B1 | 4/2003 | Hehmann et al. |
| 6,549,896 B1 | 4/2003 | Candan et al. |
| 6,816,884 B1 | 11/2004 | Summers |
| 6,826,553 B1 | 11/2004 | DaCosta et al. |
| 6,886,129 B1 | 4/2005 | Raghavan et al. |
| 7,031,308 B2 | 4/2006 | Garcia-Luna-Aceves et al. |
| 7,051,023 B2 | 5/2006 | Kapur et al. |
| 7,092,953 B1 | 8/2006 | Haynes |
| 7,181,438 B1 | 2/2007 | Szabo |
| 7,269,253 B1 | 9/2007 | Wu et al. |
| 7,483,711 B2 | 1/2009 | Burchfiel |
| 7,590,589 B2 | 9/2009 | Hoffberg |
| 7,613,851 B2 | 11/2009 | Rice et al. |
| 7,660,855 B2 | 2/2010 | Arning et al. |
| 7,680,796 B2 | 3/2010 | Yeh et al. |
| 7,689,493 B1 | 3/2010 | Sullivan et al. |
| 7,716,060 B2 | 5/2010 | Germeraad et al. |
| 7,725,467 B2 | 5/2010 | Yamamoto et al. |
| 7,725,475 B1 | 5/2010 | Alspector et al. |
| 7,725,525 B2 | 5/2010 | Work |
| 7,730,063 B2 | 6/2010 | Eder |
| 7,805,536 B1 | 9/2010 | Kompella et al. |
| 7,818,191 B2 | 10/2010 | Lutnick et al. |
| 7,822,745 B2 * | 10/2010 | Fayyad ............. G06Q 30/0207 707/732 |
| 7,831,586 B2 | 11/2010 | Reitter et al. |
| 7,885,987 B1 | 2/2011 | Lee |
| 7,958,120 B2 | 6/2011 | Muntz et al. |
| 7,984,029 B2 | 7/2011 | Alspector et al. |
| 7,996,753 B1 | 8/2011 | Chan et al. |
| 8,024,372 B2 | 9/2011 | Hark et al. |
| 8,050,965 B2 | 11/2011 | Hellevik et al. |
| 8,301,617 B2 | 10/2012 | Muntz et al. |
| 8,306,922 B1 * | 11/2012 | Kunal .................... G06Q 30/02 705/319 |
| 8,311,950 B1 * | 11/2012 | Kunal ................ G06Q 30/0201 705/319 |
| 8,370,362 B2 | 2/2013 | Szabo |
| 8,380,721 B2 | 2/2013 | Rezaei et al. |
| 8,412,575 B2 | 4/2013 | Labio et al. |
| 8,417,695 B2 | 4/2013 | Zhong et al. |
| 8,468,118 B2 | 6/2013 | Kim et al. |
| 8,572,129 B1 * | 10/2013 | Lee ......................... G06F 16/95 707/798 |
| 8,825,654 B2 | 9/2014 | Muntz et al. |
| 8,825,657 B2 | 9/2014 | Rezaei et al. |
| 8,838,605 B2 | 9/2014 | Muntz et al. |
| 8,843,434 B2 | 9/2014 | Rezaei et al. |
| 9,082,129 B2 * | 7/2015 | Dhawan ................. H04L 63/10 |
| 9,235,849 B2 * | 1/2016 | Bharat ................. G06Q 30/02 |
| 2001/0037324 A1 | 11/2001 | Agrawal et al. |
| 2001/0049688 A1 | 12/2001 | Fratkina et al. |
| 2002/0016782 A1 | 2/2002 | Cooper |
| 2002/0049792 A1 | 4/2002 | Wilcox et al. |
| 2002/0080180 A1 | 6/2002 | Mander et al. |
| 2002/0087884 A1 | 7/2002 | Shacham et al. |
| 2002/0091846 A1 | 7/2002 | Garcia-Luna-Aceves et al. |
| 2002/0143742 A1 | 10/2002 | Nonomura et al. |
| 2003/0046307 A1 | 3/2003 | Rivette et al. |
| 2003/0115191 A1 | 6/2003 | Copperman et al. |
| 2003/0187881 A1 | 10/2003 | Murata et al. |
| 2003/0217139 A1 | 11/2003 | Burbeck et al. |
| 2003/0217140 A1 | 11/2003 | Burbeck et al. |
| 2003/0220866 A1 | 11/2003 | Pisaris-Henderson et al. |
| 2003/0227479 A1 | 12/2003 | Mizrahi et al. |
| 2004/0024739 A1 | 2/2004 | Copperman et al. |
| 2004/0064438 A1 | 4/2004 | Kostoff |
| 2004/0080524 A1 | 4/2004 | Yeh et al. |
| 2004/0085797 A1 | 5/2004 | Mei |
| 2004/0093328 A1 | 5/2004 | Damle |
| 2004/0122803 A1 | 6/2004 | Dom et al. |
| 2004/0133555 A1 | 7/2004 | Toong et al. |
| 2004/0170328 A1 | 9/2004 | Ladwig et al. |
| 2004/0267638 A1 | 12/2004 | Giunta |
| 2005/0010556 A1 | 1/2005 | Phelan |
| 2005/0021461 A1 | 1/2005 | Flake et al. |
| 2005/0021531 A1 | 1/2005 | Wen et al. |
| 2005/0033742 A1 | 2/2005 | Kamvar et al. |
| 2005/0055321 A1 | 3/2005 | Fratkina et al. |
| 2005/0064618 A1 | 3/2005 | Brown et al. |
| 2005/0065980 A1 | 3/2005 | Hyatt et al. |
| 2005/0086260 A1 | 4/2005 | Canright et al. |
| 2005/0097204 A1 | 5/2005 | Horowitz et al. |
| 2005/0113691 A1 | 5/2005 | Liebschner |
| 2005/0114198 A1 | 5/2005 | Koningstein et al. |
| 2005/0114763 A1 | 5/2005 | Nonomura et al. |
| 2005/0117593 A1 | 6/2005 | Shand |
| 2005/0138070 A1 | 6/2005 | Huberman et al. |
| 2005/0144065 A1 | 6/2005 | Calabria et al. |
| 2005/0144162 A1 | 6/2005 | Liang |
| 2005/0160107 A1 | 7/2005 | Liang |
| 2005/0182755 A1 | 8/2005 | Tran |
| 2005/0203838 A1 | 9/2005 | Zhang et al. |
| 2005/0210008 A1 | 9/2005 | Tran et al. |
| 2005/0210027 A1 | 9/2005 | Aggarwal et al. |
| 2005/0222900 A1 | 10/2005 | Fuloria et al. |
| 2005/0256905 A1 | 11/2005 | Gruhl et al. |
| 2005/0256949 A1 | 11/2005 | Gruhl et al. |
| 2005/0283461 A1 | 12/2005 | Sell et al. |
| 2006/0004649 A1 | 1/2006 | Singh |
| 2006/0004703 A1 | 1/2006 | Spivack et al. |
| 2006/0041548 A1 | 2/2006 | Parsons et al. |
| 2006/0047649 A1 | 3/2006 | Liang |
| 2006/0080422 A1 | 4/2006 | Huberman et al. |
| 2006/0085408 A1 | 4/2006 | Morsa |
| 2006/0106793 A1 | 5/2006 | Liang |
| 2006/0106847 A1 | 5/2006 | Eckardt et al. |
| 2006/0112105 A1 | 5/2006 | Adamic et al. |
| 2006/0112111 A1 | 5/2006 | Tseng et al. |
| 2006/0168065 A1 | 7/2006 | Martin |
| 2006/0171331 A1 | 8/2006 | Previdi et al. |
| 2006/0184464 A1 | 8/2006 | Tseng et al. |
| 2006/0209727 A1 | 9/2006 | Jennings et al. |
| 2006/0212350 A1 | 9/2006 | Ellis et al. |
| 2006/0218035 A1 | 9/2006 | Park et al. |
| 2006/0235841 A1 | 10/2006 | Betz et al. |
| 2006/0242017 A1 | 10/2006 | Libes et al. |
| 2006/0271564 A1 | 11/2006 | Muntz et al. |
| 2006/0294155 A1 | 12/2006 | Patterson |
| 2007/0025364 A1 | 2/2007 | Kodialam et al. |
| 2007/0033103 A1 | 2/2007 | Collins et al. |
| 2007/0038614 A1 | 2/2007 | Guha |
| 2007/0061300 A1 | 3/2007 | Ramer et al. |
| 2007/0084778 A1 | 4/2007 | St.Germain et al. |
| 2007/0100923 A1 | 5/2007 | Ahmed et al. |
| 2007/0143329 A1 | 6/2007 | Vigen |
| 2007/0174255 A1 | 7/2007 | Sravanapudi et al. |
| 2007/0203903 A1 | 8/2007 | Rezaei et al. |
| 2007/0239534 A1 | 10/2007 | Liu et al. |
| 2007/0245035 A1 | 10/2007 | Rezaei et al. |

(56) References Cited

U.S. PATENT DOCUMENTS

| | | | |
|---|---|---|---|
| 2007/0300152 A1 | 12/2007 | Baugher | |
| 2008/0005072 A1* | 1/2008 | Meek | G06F 16/9535 |
| 2008/0033932 A1 | 2/2008 | DeLong et al. | |
| 2008/0065483 A1 | 3/2008 | Ball | |
| 2008/0086592 A1 | 4/2008 | Stephani | |
| 2008/0104061 A1 | 5/2008 | Rezaei | |
| 2008/0140491 A1 | 6/2008 | Jain et al. | |
| 2008/0162260 A1* | 7/2008 | Rohan | G06Q 30/0269 705/14.4 |
| 2008/0189169 A1 | 8/2008 | Turpin et al. | |
| 2008/0232809 A1 | 9/2008 | Beshai et al. | |
| 2008/0256061 A1 | 10/2008 | Chang et al. | |
| 2008/0301033 A1 | 12/2008 | Singh et al. | |
| 2009/0043648 A1 | 2/2009 | Mandian et al. | |
| 2009/0046678 A1 | 2/2009 | Lee et al. | |
| 2009/0086663 A1 | 4/2009 | Ho et al. | |
| 2009/0157855 A1 | 6/2009 | Adam et al. | |
| 2009/0168768 A1 | 7/2009 | Chiabaut et al. | |
| 2009/0265475 A1 | 10/2009 | Fujita | |
| 2009/0281900 A1 | 11/2009 | Rezaei et al. | |
| 2009/0296719 A1 | 12/2009 | Maier et al. | |
| 2009/0300009 A1 | 12/2009 | Rezaei et al. | |
| 2010/0070335 A1* | 3/2010 | Parekh | G06Q 30/0254 705/14.52 |
| 2011/0113032 A1 | 5/2011 | Boscolo et al. | |
| 2011/0194682 A1* | 8/2011 | Hans | G06Q 10/107 379/201.04 |
| 2011/0238647 A1* | 9/2011 | Ingram | G06F 16/285 707/706 |
| 2011/0264519 A1* | 10/2011 | Chan | G06Q 30/0251 705/14.49 |
| 2011/0276396 A1* | 11/2011 | Rathod | H04L 51/066 705/14.49 |
| 2011/0276563 A1 | 11/2011 | Sandoval et al. | |
| 2011/0280640 A1* | 11/2011 | Gnanasambandam | G06Q 30/08 400/76 |
| 2011/0288939 A1* | 11/2011 | Elvekrog | G06Q 30/0269 705/14.67 |
| 2011/0295688 A1* | 12/2011 | Shen | G06Q 30/0241 705/14.54 |
| 2012/0005224 A1* | 1/2012 | Ahrens | G06F 16/285 707/769 |
| 2012/0158489 A1* | 6/2012 | Benyamin | G06Q 30/0256 705/14.45 |
| 2012/0278166 A1* | 11/2012 | Badros | G06Q 30/0251 705/14.53 |
| 2012/0324027 A1* | 12/2012 | Vaynblat | H04L 51/32 709/206 |
| 2013/0041949 A1* | 2/2013 | Biesecker | G06F 16/23 709/204 |
| 2013/0046797 A1 | 2/2013 | Muntz et al. | |
| 2013/0046842 A1 | 2/2013 | Muntz et al. | |
| 2013/0073546 A1 | 3/2013 | Yan et al. | |
| 2013/0124322 A1* | 5/2013 | Boland | G06Q 30/0255 705/14.58 |
| 2013/0124437 A1* | 5/2013 | Pennacchiotti | G06N 20/00 706/12 |
| 2013/0124447 A1* | 5/2013 | Badros | G06Q 30/0251 706/52 |
| 2013/0124626 A1* | 5/2013 | Cathcart | G06F 16/248 709/204 |
| 2013/0132194 A1* | 5/2013 | Rajaram | G06Q 50/01 705/14.52 |
| 2013/0159110 A1* | 6/2013 | Rajaram | G06Q 50/01 705/14.66 |
| 2013/0159132 A1* | 6/2013 | Adams | H04L 51/32 705/26.7 |
| 2013/0191372 A1* | 7/2013 | Lee | G06F 16/9535 707/722 |
| 2013/0198191 A1 | 8/2013 | Hernández et al. | |
| 2013/0332523 A1* | 12/2013 | Luu | G06Q 30/0269 709/204 |
| 2014/0033074 A1* | 1/2014 | Thibaux | G06Q 50/01 715/753 |
| 2014/0040184 A1 | 2/2014 | Benissan | |
| 2014/0052540 A1* | 2/2014 | Rajaram | G06Q 30/0255 705/14.66 |
| 2014/0067870 A1* | 3/2014 | Chandrasekhar | H04L 67/10 707/797 |
| 2014/0351237 A1* | 11/2014 | Rezaei | G06F 16/9024 707/709 |
| 2015/0127628 A1* | 5/2015 | Rathod | G06F 16/955 707/710 |
| 2015/0262255 A1 | 9/2015 | Khajehnouri et al. | |

FOREIGN PATENT DOCUMENTS

| | | |
|---|---|---|
| WO | 2006121575 A2 | 11/2006 |
| WO | 2007084616 A3 | 4/2008 |

OTHER PUBLICATIONS

Bollobas, B., "Random Graphs," Second Edition, Cambridge University Press, United Kingdom, 2001, Chapter 1 and 2, pp. 1-59.

Boscolo, R., et al., "Functionality Encoded in Topology? Discovering Macroscopic Regulatory Modules from Large-Scale Protein-DNA Interaction Networks," Reprint arXiv:q-bio/0501039, Jan. 2005.

Calado, P., et al., "Combining Link-Based and Content-Based Methods for Web Document Classifications," CIKM'03, pp. 394-401, ACM, 2003.

Chao, I. et al., "Tag Mechanisms Evaluated for Coordination in Open Multi-Agent Systems," ESAW 2007, LNAI 4995, Springer-Verlag Berlin Heidelberg, 2008, pp. 254-269.

Chung, F. et. al., "The Small World Phenomenon in Hybrid Power Law Graphs," Leet. Notes Phys., vol. 650, 2004, pp. 89-104.

Clausel, A. et al., "Finding Community Structure in Very Large Networks," Physical Review, vol. 70, No. 6, Dec. 2004, 066111.

Erdos, P. et al., "On the Evolution of Random Graphs," Publication of the Mathematical Institute of the Hungarian Academy of Sciences, vol. 5, 1960, pp. 343-347.

Erdos, P. et al., "On the Strength of Connectedness of a Random Graph," Acta Mathematica Scientia Hungarica, vol. 12, Nos. 1-2, 1961, pp. 261-267.

Flake, G. W. et al., "Self-Organization and Identification of Web Communities," IEEE Computer Society, vol. 35, Issue 3, Mar. 2002, pp. 1-7.

Franceschetti et. al., "Closing the Gap in the Capacity of Wireless Networks Via Percolation Theory," Oct. 26, 2004, IEEE, pp. 1009-1018.

Franceschetti M. et. al., "Navigation in Small World Networks, a Scale-Free Continuum Model," Jul. 2003, pp. 1-9.

Garton, L., et al., "Studying On-Line Social Networks," Doing Internet Research, Edited by S. Jones, Thousand Oaks, Calif., 1999, pp. 75-105.

Girvan, M. et al., "Community Structure in Social and Biological Networks," PNAS, vol. 99, No. 12, Jun. 2002, pp. 7821-7826.

Golbeck, "Accuracy of Metrics for Inferring Trust and Reputation in Semantic Webbased Social Networks," Apr. 2004, pp. 1-11.

Gonzalez-Barahona, J. M. et al., "Community Structure of Modules in the Apache Project," MSR '05: Proceedings of the 2005 International Workshop on Mining Software Repositories, 2005, 5 pages.

Jiang, et al., "Monotone Percolation and the Topology Control of Wireless Networks", California Institute of Technology, Electrical Engineering Dept, 0-7803-8968-9/05, 2005, pp. 327-338.

Kernighan, B. W. et al., "An Efficient Heuristic Procedure for Partitioning Graphs," the Bell System Technical Journal 49, Feb. 1970, pp. 291-307, 5 pages.

Kini et. al., "Fast and efficient randomized flooding on lattice sensor networks", Nov. 19, 2004, Drexel University, pp. 1-33.

Kong et al., "Collaborative Spam Filtering Using E-Mail Networks", Aug. 2006, IEEE, pp. 67-73.

Lyons, R. et al., "Probability on Trees and Networks," Apr. 17, 2005, pp. 1-45.

(56) References Cited

OTHER PUBLICATIONS

Manku, G. S. et. al., Know thy Neighbor's Neighbor: the Power of Lookahead in Randomized P2P Networks, Stoc'04, Jun. 2004, pp. 1-10.
Newman, M. E. J., "Coauthorship Networks and Patterns of Scientific Collaboration," PNAS, vol. 101, Apr. 2004, pp. 5200-5205.
Newman, M. E. J., "Fast Algorithm for Detecting Community Structure in Networks," Physical Review E 69, Jun. 2004, pp. 066133.1-066133.5.
Newman, M.E.J. et al., "Finding and Evaluating Community Structure in Networks," Physical Review E, vol. 69, 026113, 2004, pp. 1-16.
Newman, M.E.J. et al., "Scaling and percolation in the small-world network model", Sante Fe Institute, May 6, 1999, DD. 1-12.
Newman, M.E.J., "Random Graphs as Models of Networks", SFI Working Paper: 2002-02-005, 2002, pp. 1-36.
Owczarek, A. L. et. al., "Generalised Percolation Probabilities for the Self-Dual Potts Model," J. Phys. A: Math. Gen. Apr. 20, 1987, pp. 5263-5271.
Page, L. et al., "The p. Rank Citation Ranking: Bringing Order to the Web," Technical Report, Stanford Info Lab, 1999, pp. 1-17.
Patch, K., "Simple search lightens Net load," TRN, Sep. 2004, pp. 1-3.
Pons, P. et al., "Computing Communities in Large Networks Using Random Walks," ArXiv Condensed Matter e-prints, Dec. 2004, 20 pages.
Pothen, A. et al., "Partitioning Sparse Matrices with Eigenvectors of Graphs," Society of Industrial and Applied Mathematics, SIAM Journal on Matrix Analysis and Applications, vol. 11, No. 3, Jul. 1990, pp. 430-452.
Radicchi, F. et al., "Defining and Identifying Communities in Networks," PNAS, vol. 101, No. 9, Mar. 2004, pp. 2658-2663.
Rives, A. W. et al., "Modular Organization of Cellular Networks," PNAS, vol. 100, No. 3, Feb. 2003, pp. 1128-1133.
Sarshar, N. et al., "Scalable Percolation Search in Power Law Networks," Jun. 2004, Department of Electrical Engineering, University of California, Los Angeles, pp. 1-13.
Scott, J. "Social Network Analysis: A Handbook," 2nd Edition, Sage Publications, London, 2000, Chapter 4, pp. 63-81.
Silverberg, et al., "A Percolation Model of Innovation in Complex Technology Spaces", Sep. 2002, Merit—Infonomics Research Memorandum Series, pp. 1-24.
Wang, G., "Web Search with Personalization and Knowledge", 2002 Proceedings of the IEEE Fourth International Symposium on Multimedia Software Engineering (MSE '02).
Wasserman, S., "Social Network Analysis: Methods and Applications," Cambridge University Press, Cambridge, England, 1994, pp. 17-20 and Chapter 7, pp. 249-290.
Weikum, G. et al., "Towards Self-Organizing Query Routing and Processing for Peer-to-Peer Web Search", DELIS-TR-0287, 2005, 19 pages.
Wellman, B. et al., "Computer Networks as Social Networks: Collaborative Work, Telework, and Virtual Community," Annual Reviews Sociology, vol. 22, No. 1, 1996, pp. 213-238.
Wu, F. et al., "Finding Communities in Linear Time: a Physics Approach," the European Physical Journal B, vol. 38, No. 2, 2004, pp. 331-338.
Zachary, W.W. "An Information Flow Model for Conflict and Fission in Small Groups," Journal of Anthropological Research, vol. 33, No. 4, Winter, 1977, pp. 452-473.
Zou et al., "Email Virus Propagation Modeling and Analysis", Univ. of Mass., Dept. of Electrical and Computer Engineering, Dept of Computer Science, 2004, TR-CSE-03-04, pp. 1-17.

\* cited by examiner

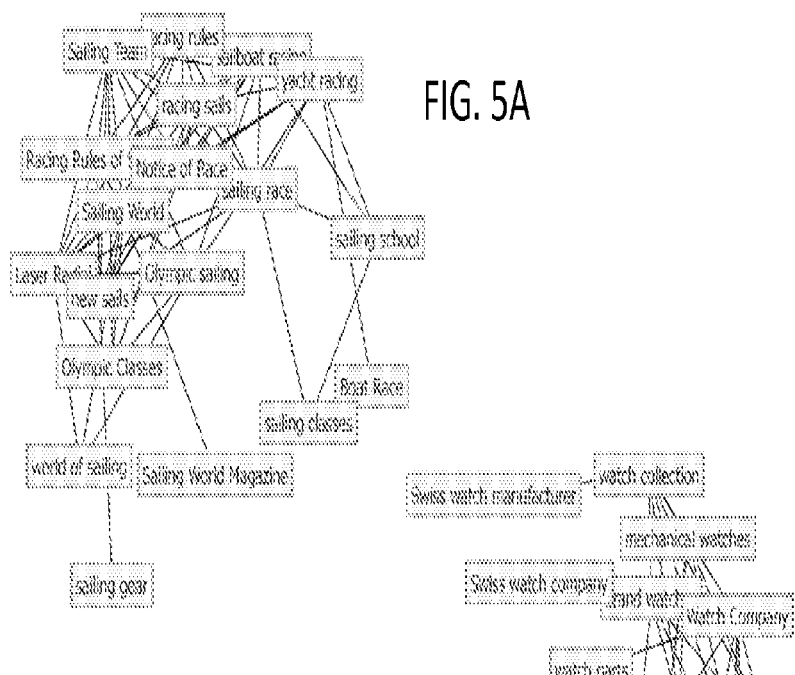
FIG. 5A
FIG. 5B
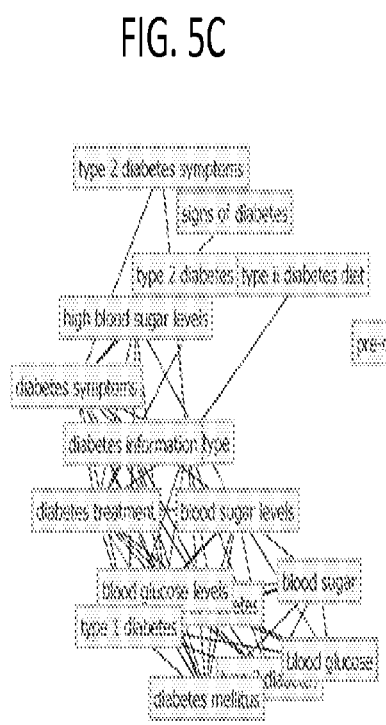
FIG. 5C

Mr. X has 6 posts, 3 of them about the baseball team "Giants", 3 about online ad targeting.

Mr. Y likes 2 of the posts about Giants

Social signal mode (Only): Mr. Y likes posts from Mr. X (Higher priority)

Contextual Social Signal: Mr. Y likes posts from Mr. X about sports, specifically baseball, and specifically giants.

FIG. 8

CONCEPT-LEVEL USER INTENT PROFILE EXTRACTION AND APPLICATIONS

BACKGROUND

1. Field

The present disclosure relates generally to concept-level user intent profile extraction and applications to monetization and user-engagement enhancement in large-scale social media platforms.

2. Related Art

In the online world there is a major need to be able to understand and create temporally evolving profiles of users, and how they interact with the various institutions and activities, both online and in the real world. If such understanding and profiling, both at the individual user level and at the collective level of groups of users, can be achieved, then the various service providers (e.g., social media sites, online advertisers, offline stores and organizations) can use automated algorithms to serve the right information, content, and services to every individual and organizations (i.e., groups of users) in the right context and at the right time. The only kinds of information available online are the individual user actions, and the kind of structured data they share with various social media and other sites that they register with voluntarily. The structured data shared, e.g., one's place of residence, education level and degrees obtained, professional credentials, and their explicitly stated friends, email contact lists, and followers on social media and news sites, etc. is easy to categorize and collect and is being stored and heavily utilized and mined by various online entities such as social networking and media sites, including Facebook, Twitter, LinkedIn, Google+ etc.

The majority of user actions, however, are unstructured and when aggregated, comprises of billions of atomic or elementary actions, per day such as (i) user's Votes or Likes for articles, posts, or other users' posts and activities, (ii) searches done at major search engines and at individual sites, (iii) articles and web pages browsed, and (iv) posts on social media and networking sites and other interactions made among friends on such sites. For example, not all friends are created equal, and one shares different types of information and activities with different sets of friends and colleagues. Such preferences are not explicitly expressed and defined, but rather can only be inferred from the content of the posts shared and liked, and the locations visited together and can evolve over time.

One computationally challenging problem is how to make sense of individual users, and of groups of users collectively, from the billions of such seemingly diverse elementary actions and the available structured data. Is it possible to create a unified informational and functional view of individual users and groups of users that is granular enough to capture all aspects of behavior and preferences, and can evolve over time to be able to track a user's evolving needs and interests? Others have tried to accomplish such a task at different levels of granularity and with varying success, but a comprehensive and a computationally scalable solution has not been proposed.

For example, in the existing art detailed structured databases are created based on the explicitly stated attributes of users. This may include, age, gender, place of residence, education and schools attended, favorite institutions, such as sports teams, favorite, TV shows, music and music artists, celebrities, preferred types of food etc. These are valuable information but the expressive capabilities of such explicitly stated categories are known to be very limited in characterizing a user's intent and profile accurately. Moreover, often such information is outdated and is incorrectly entered making them prone to be highly noisy. Once entered in a database they cannot be easily updated or corrected.

The main way to deal with unstructured activities has been to use taxonomies with predefined categories organized in various data structures, such as a tree. For example if a person visits a sports page talking about the Los Angeles Lakers then that activity could be categorized as an activity related to Sports/Basketball/Lakers. These categories are then aggregated to create user profiles. The major drawbacks of such an approach are two-fold: (i) taxonomies have to be defined manually and can comprise only a limited number of categories in them. The manual nature of the process makes it less expressive, and user actions cannot be captured comprehensively and at the right granularity by such necessarily limited sets of categories. (ii) Every action and content has to be classified as belonging to one of the categories in a taxonomy and this process of classification is highly error prone. The only ways to achieve such classification is via (i) extensive training, which means providing examples of known pages or content for each category and (ii) providing a set of keywords or terms for each category and a classification is done based on how many or what sets of such keywords appear in a document. Both of these methods are highly manual and have computational problems associated with them, including (i) the accuracy of the underlying classification engine is only as good as the training sets provided to them; it can lead to over training quite easily and thereby poor generalization capabilities on new content, (ii) the bigger the taxonomy the more is the manual and supervised part of the training process, (iii) keywords are notoriously ambiguous and lead to highly inaccurate classifications, and finally (iv) often documents or content belong to multiple categories at the same time, and training for such cases that involves classifying documents as belonging to more than one category at the same time leads to a combinatorially intractable problem.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

To address the above mentioned limitations we present a system and methodology for creating unified intent profiles based on a collective/global concept graph, comprising nodes that are concepts, and edges that are relationships among such concepts. Naturally occurring and overlapping sub-graphs or communities in such a concept graph organically define potential intent space of users. Each activity, such a search or a Like, is mapped to the concept graph and a weighted subgraph is identified in the underlying concept graph as a record of the activity. Such weighted subgraphs are then aggregated over all activities of a user to create a temporally evolving intent space profile of a user. Such a shared concept graph, with highly granular concept level expressiveness, allows one to not only capture individual users' intent with unprecedented accuracy and detail, but also allows one to compare and group similar users. It is as if an all-knowing human goes through and catalogs all the activities of every user and creates a summary in her mind, which allows comparison of individuals across both time and geo-locations.

According to one embodiment, a method is disclosed that includes extracting an intent profile of a user based on activities executed and information shared on a social media site by the user. Extracting the intent profile includes identifying structured user data from the social media site; identifying user activities exclusively on the social media site; identifying user activities involving the Internet; identifying incoming likes, sharing, recommendation on the social media site; identifying user searches; determining a social graph and connections of the user; and determining a weighted cluster and sub-graph of a global concept graph, wherein the global concept graph comprises nodes that are concepts, and edges that are relationships among such concepts; and determining a user intent from the intent profile of the user.

The method may further include targeting an advertisement to the user based on the determined user intent.

The method may further include generating a score for each vertical in a targeting vertical list. The score may include a time factor and an interest factor. The score may be generated based on user activities exclusively on the social media site, user activities involving the Internet, incoming likes, sharing, recommendation on the social media site, and user searches.

The method may further include modifying a user experience of the user by organizing a contact list of the user and conversations and posts of the user based on their content and conceptual context.

The method may further include performing an aggregation scoring.

The structured data may include an email identification, phone number, geo-location, friends and links.

The concepts may include phrases that represent entities (e.g. people, companies, drugs, diets, films, shows, events etc.), domain-specific terms (e.g., sports and medical terminologies, specific treatments, procedures etc.), and common expressions that are used to convey information. The relationships may be identified by annotated edges among concepts. The relationships may be measures of closeness among the concepts, including at least one of co-occurrence statistics and explicit semantic relationships.

The method may include tagging the user intent profiles with temporal data.

Determining the weighted sub-graph may be based on a number of the user's friends that share the same nodes or edges.

The method may further include tagging unstructured data using collective activities of users at the social media site.

The method may further include prioritizing unstructured data using collective activities of users at the social media site.

The method may further include post-processing and tagging the user profile post-processed and tagged with weighted category scores defined over a structured taxonomy of interest.

The method may further include assigning each such advertiser a set of advertiser target profiles.

The advertiser target profile may include one or more weighted and time-tagged sub-graphs of the global concept graph.

The advertiser target pro file may include a weighted list of categories picked from a structured taxonomy.

The method may further include determining for each user a weighted and prioritized list of advertisers that best match the user intent.

Matching user intent to an advertiser may include computing an overlap or distance between the user intent profile and the advertiser target profile by computing a measure of the distance between the two corresponding weighted sub-graphs in the global concept graph.

Selecting a final set of advertisement units may be completed by an optimization process that maximizes objective functions of interest, including revenue for the social media site, value and Return-On-Investment (ROI) for the advertisers, while considering the device and media that the user is on at the time of the impression.

Modifying a user engagement may include organizing friends or contact lists of a user into potentially overlapping groups by computing similarity between a user's profile and the profiles of those of his friends and contacts.

Organizing friends or contact lists of a user into potentially overlapping groups may include computing similarity between a user's profile and the profiles of those of the user's friends and contacts.

Modifying a user engagement may include organizing posts, comments and social interactions between a user and his friends based on an underlying context.

The linear list of posts on page of the social media site can be organized into categories by automatically classifying the posts by mapping the posts to categories in the global concept graph.

The method may further include post-processing and tagging the user profile with weighted category scores defined over a structured taxonomy of interest.

The method may further include determining a suggested search term based on the intent profile.

The method may further include grouping content based on communal user actions;

and dividing the grouped content into clusters. The method may further include generating a collective content profile; and tagging the corresponding users. The method may further include prioritizing the grouped content based on page and domain statistics.

Computer systems having memory and a processor for implementing the method are also disclosed. A computer readable storage medium for executing the method is also disclosed.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

FIG. 1 is an example sub-graph of a concept graph where nodes comprise concepts and edges their relationships. Such sub-graphs in the concept graph naturally define different topics or categories in knowledge space. Because of the nature of the graphical representation with edge and node weights, the categories are overlapping and can evolve as the nature of the network and the relative weights change over time.

As shown in FIG. 3A, the same user, i.e., the user with the same ID as in FIG. 2A, visits another page related to insulin pumps. As shown in FIG. 3B, the user action is mapped to the global concept graph. In FIG. 3B, the nodes in grey are subset of nodes in the graph neighborhood related to this user action. As shown in FIG. 3B, the Concept graph provides one globally shared template for tracking user actions.

As shown in FIG. 4A, the same user as in FIGS. 2 and 3 queries for "Sulfonylureas". This is mapped to nodes in the Concept Graph, as shown in FIG. 4B. As shown in FIG. 4B, the nodes in dark grey are a subset of nodes in the graph neighborhood in the Concept Graph related to the search user action. As shown in FIGS. 2B-4B, the three different actions (FIGS. 2A-4A) may be mapped to the same neighborhood and highly connected region of the underlying concept graph.

FIGS. 5A-5C illustrate combing a social graph and a concept graph. A social networking site can use the improvements described herein to create powerful User-Intent Profiles. For example, a hypothetical Mr. X can have structured information such as: Male, 34, Santa Clara, Calif., Widowed, Working Organization Affiliations: Sharif University, Iran, UCLA and NetSeer. The user's explicit Intent may include: Likes: Classical Music, Chopin, Peruvian Food. The user's social Graph(Friends) may include: CEO's of Yahoo!, Facebook, and NetSeer; Michael Jackson, and Mario Batali. From the unstructured actions, such as likes and browsing, one can represent the person as: Mr X is a diabetic that likes sailing and Rolex watches. These characterizations are captured as the weighted sub-graphs in the globally shared Concept Graph, which are shown in FIGS. 5A-5C.

In FIG. 6, a post by a user about aerobics is matched to search suggestions related to exercise, dieting and weight loss.

As shown in FIG. 7, an entity such as the assignee, NetSeer, can take all the inputs from social networks, web browsing, and other activities and then empower a Social Advertiser Platform. The user intent profiles can be used to create personalized advertisement creatives that are suitable for any format and media, including social networking posts, mobile devices, and web pages. The demand side feeds that can be used are search ad feed, display advertisement, as well as feeds meant for social sites. The supply side inventories could come from social networking inventory, the conventional web pages or mobile inventory. In mobile inventory, one form of advertisement could be search suggestions targeted for the individual user in the right context, i.e, the search suggestions not match the intent profile of the user but also match the context of the page being viewed or the App being used.

FIG. 8 illustrates one exemplary application of the invention to enhancing user experience on a social networking site. Currently the signal is mostly social, that is, for example, who likes whose posts. However this leads to a cluttered user experience. As illustrated in FIG. 8, embodiments of invention enables addition intent/context signal to the social signal. Thus, in FIG. 8, posts from Mr. X on baseball and specifically for the Giants could be given higher priority when listed on the wall of Mr. Y.

DETAILED DESCRIPTION

Figure 1:
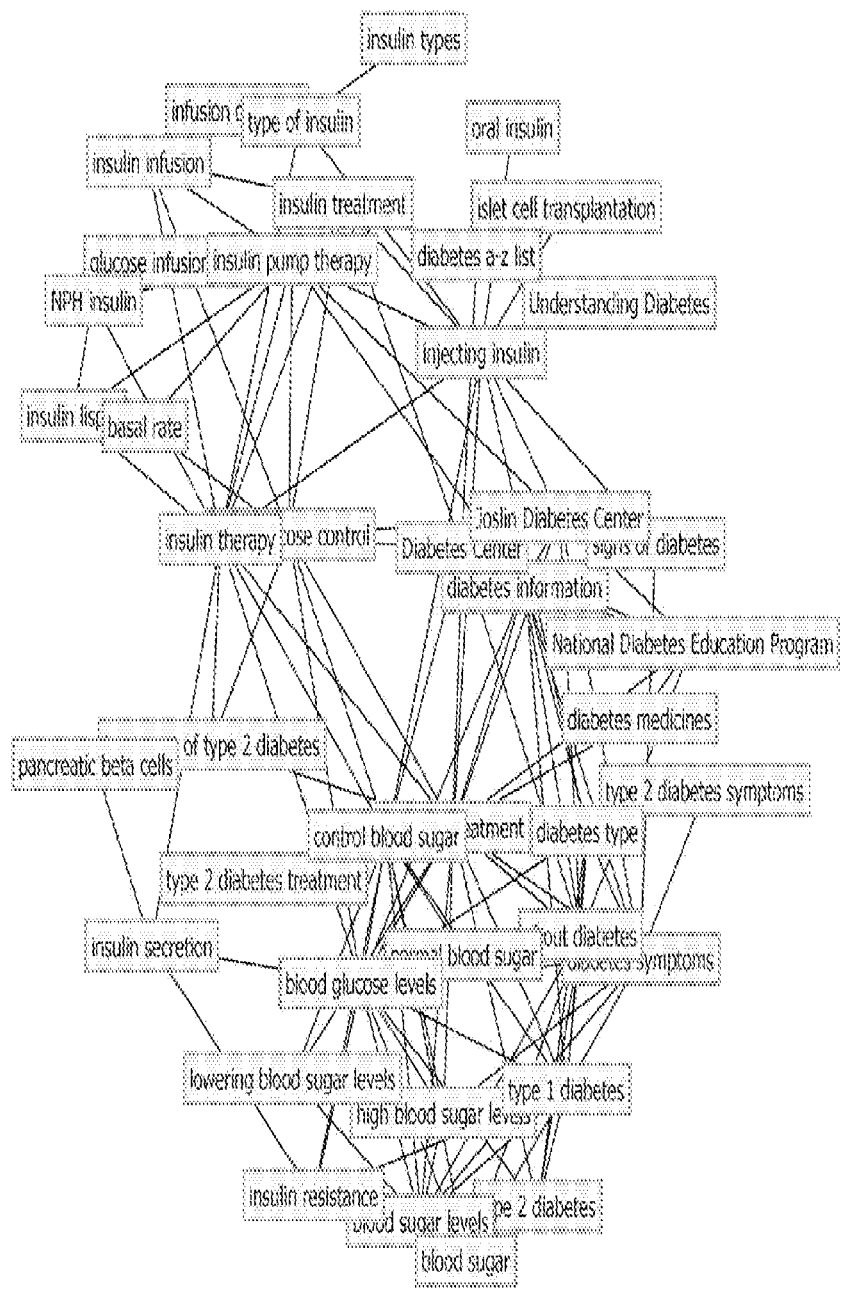
FIG. 1 is a graphical view of a sample concept cluster around diabetes.

Embodiments of the invention teaches methods and systems for extracting intents and. intent profiles of users, as inferred from the different activities they execute and data they share on social media sites, and then (i) monetization of such intents via targeted advertisements, and (ii) enhancement of user experience via organization of their contact lists and conversations and posts based on their content and conceptual context.

In the following paragraphs, a local algorithm according to the present invention based on percolation theory is described. Then the local community finding is generalized to an algorithm to detect and explore community structure of a complex network. Thereafter benchmarking is disclosed for the algorithm using different randomly generated networks and real world networks employed in the literature to estimate the performance of community finding algorithms.

Example 1

Percolation Community Finding Approach

In this section a social definition of communities is adopted, showing that percolation identifies communities of a given vertex compared to previous diffusion based algorithms. Next, essentials and performance of the algorithm on ER random graphs are illustrated.

A. Social Communities Revisited

While other definitions provide important insight into partitioning of the graph, a more local approach is chosen herein. Unlike cohesive community definitions, Garton et. al. [8] define communities as follows. In social network analysis context, a group is an empirically-discovered structure. By examining the pattern of relationships among members of a population, groups emerge as highly interconnected sets of actors known as cliques and clusters. In network analytic language, they are densely-knit (most possibilities exist) and tightly-bounded, i.e., most relevant ties stay within the defined network [18-20]. Social network analysts then want to know who belongs to a group, as well as the types and patterns of relations that define and sustain such a group. Note that this definition differs from pervious cohesive definitions used by Newman and others that not only most relevant ties should stay within the community but also nodes should be highly interconnected. [19]. It also allows overlap between communities.

This definition arises naturally in many biological, social or web networks that vertices with close functionality or interest form highly clustered communities. A vertex is connected to many other vertices within the community.

B. Percolation: Background

In an embodiment of the present invention, bond percolation is used as a tool for vertices to explore and identify their structural neighborhood. Percolation theory was first used to study the flow of fluids in porous media and introduced a new approach to problems usually dominated by diffusion theory. Percolation theory has been used to describe randomness and disorder in the structure of the medium while diffusion processes ascribe random movements of agents in a deterministic structure. Similar concepts have been used extensively in complex networks literature to model and analyze different phenomena in the network such as random walk and network robustness to node and edge failures. Many of these nonlinear dynamic properties of complex networks undergo phase transition when subject to different factors that affect interactions of structure and movement of agents in the system.

Figure 2A:
FIGS. 2A and 2B illustrate mapping a user action to a global concept graph. The user activity is illustrated in FIG. 2A by the user, who is tagged with an ID, who visits a page on diabetes. The user action in FIG. 2A is mapped to the globally shared Concept Graph by finding the concepts that are most important to the page visited by the user as shown in FIG. 2B. Nodes in grey are subset of nodes in the graph neighborhood related to the user action of visiting the WebMD page, around the concept diabetes.
Figure 2A:
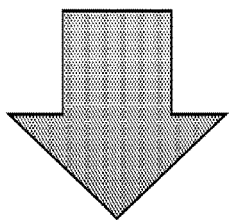

Other community finding algorithms have extensively used diffusion processes and random walks to define betweenness and identify partitioning of a network into different communities. According to the present invention, a different approach, percolation theory, is used to identify a highly clustered group of vertices that have close ties to each other. Diffusion based algorithms are based on the observation that edge betweenness [24] of edges at community boundaries are high since they enable communication between nodes in different communities. FIG. 1 illustrates this concept where thickness of edges are proportional to shortest-path betweenness between all vertices in the network. It may be easily seen that while boundaries of cohesive communities are easily identified, it does not perform well in overlapping communities. Instead of performing random walks, a percolation message is started from a node, constitutes the set of connected components and looks at the components when their size does not increase as percolation probability is increased, as shown in FIG. 2. FIG. 1D and FIG. 1E show how a distributed percolation search may return highly clustered nodes to a vertex where size of the nodes are proportional to the fraction of percolation messages returned. The random walk based algorithms may be viewed as randomized versions of breadth-first search while percolation method is a randomized version of depth-first search.

C. Performance on Random Graphs

Review of a simple community model in random graphs shows the relationship between empirical social definitions and complex network analysis. A collection of highly clustered ER graphs have been extensively used in the literature to analyze simple performance of community finding algorithms [9, 12, 15]. A random graph is a graph in which properties such as the number of graph vertices, graph edges, and connections between them are determined in some random way [2]. For many monotone-increasing properties of random graphs, graphs of a size slightly less than a certain threshold are very unlikely to have the property, whereas graphs with a few more graph edges are almost certain to have it. This is known as a phase transition or threshold phenomena. Of particular interest is the size of the largest connected component of the graph. An ER graph $G(N; p)$ is a random graph with n vertices where each pair of vertices has an edge between them with probability p, [5, 6]. the existence of any two edges are independent events.

Consider a random ER graph of size N, where each pair of vertices are connected with probability $p0(N)$. This may be viewed as (bond) percolation on a complete graph with percolation probability of $p0(N)$. Erdos and Renyi [5, 6] show that the connected components have interesting properties when $p0(N)$ scale as $p0(N) \propto c/N$. Depending on c, following behaviors happen with probability one for large N:

I. For $c<1$ size of the largest connected component is $\Theta(\log(N))$.

II. At phase transition and for $c=1$ size of the largest connected component is $\Theta(N^{2/3})$.

III. For $c>1$ a giant component appears and has size $\Theta(N)$.

Remark 1: Bond percolation on an ER graph of $G(N; p0)$ with probability pp will result in an ER graph of $G(N; p0.pp)$ Thus the critical percolation probability for a randomly generated graph with p0 is given by $pc=c/(p0N)$ where $c>1$. below this probability, vertex i will belong to a connected component of maximum size $\Theta(\log(N))$ and above the threshold the probability of almost all vertices belonging to a giant connected component is a constant, i.e. there is a path between any two randomly chosen pair of vertices with non vanishing constant probability for large N.

For a vertex i define set $S_i$ p as the connected component i including vertex i when (bond) percolating with probability p. Define the community with strength p of vertex i, $C_i$ p, as pair of (j, m) where $j \in S_i$ p for m iterations out of k iterations where $m>kth$.

Figure 3A:
FIGS. 3A and 3B further illustrate tracking user actions.
Figure 3A:
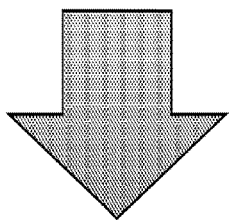

The question remaining is how a vertex i identifies its communities distinctively, i.e. what values of percolation strength p corresponds to distinguishable communities. Returning to the definition of communities as sets of vertices with similar interest or topic and thus higher probability of connection, one may observe that communities will emerge as connected components when varying percolation probability. To illustrate this more consider a simple example of an ER graph, $G(N, p0)$ of size N with probability p0. A subset $\Gamma$ of nodes form a local community of size M, i.e. each pair of vertices are connected with probability $p\Gamma \gg p0$, as illustrated in FIG. 3. Then, Remark 2: For large M and N and percolation threshold of $c/(p0N) \gg pc \gg c/(p\Gamma M)$, probability of any two vertices i and j belonging to a connected component is one if they belong to F and is vanishingly small otherwise.

Proof

The proof follows directly from property II since the percolation threshold is above the threshold for an ER graph of F and below the percolation threshold of a global ER graph.

This means that for any vertex i in F, $C_i$ p is approximately F for $c/(p0N) > p > c/(p\Gamma M)$ and will include almost all vertices of G for $p > c/(p0N)$.

Figure 4A:
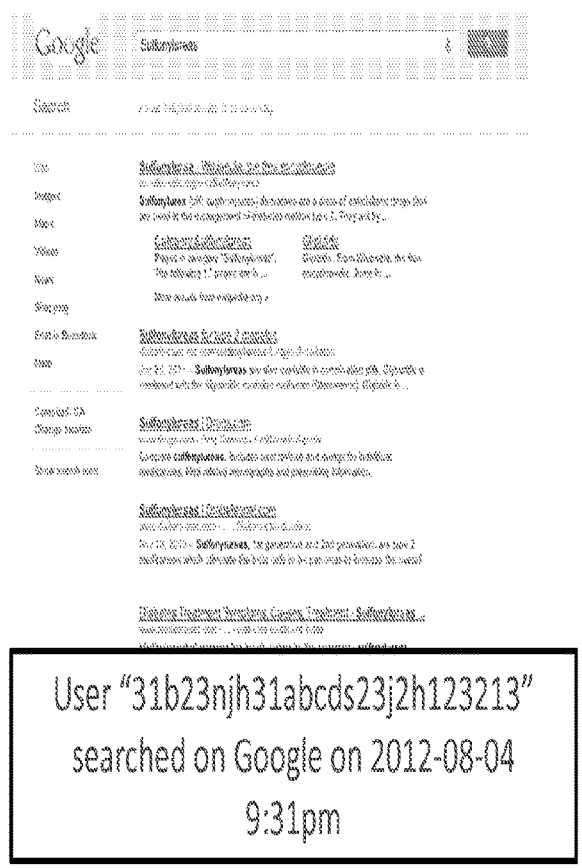
FIGS. 4A and 4B further illustrate tracking user actions.
Figure 4B:
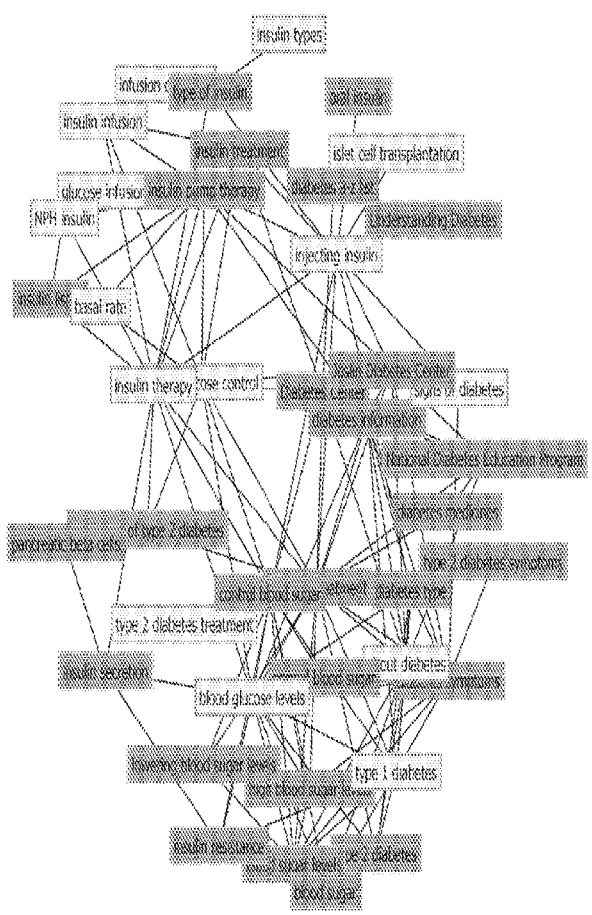

The definition is now generalized to multiple overlapping and non overlapping communities and investigate the behavior of $C_i$ p in different cases. Consider an ER graph of size N with probability p0 and two subgraphs, $\Gamma 1$ and $\Gamma 2$ of size M1 and M2 and connection probabilities of $p1 \gg p0$ and $p2 \gg p0$ respectively. Define critical percolation probabilities $pci=c/(piMi)$, $i=1, 2$. Looking at the connected components as the percolation probability is swept for both overlapping and non overlapping cases, is illustrated in FIG. 4A and FIG. 4B.

For $c/(p0N) > pp > \max(pc1, pc2)$ the percolation probability is above subgraph percolation probabilities so using remark 2 almost all the vertices in each community are connected. Now consider two cases:

If $\Gamma 1$ and $\Gamma 2$ have overlaps then any two vertices within same subgraph are almost surely connected. So any two vertices in both the communities are connected almost surely. If starting percolation from a node in Fk, it will get back fraction qk of iterations from nodes in $\Gamma k$, and naively fraction q1q2 of iterations from nodes in other community.

2.

If Γ1 and Γ2 are non-overlapping, the probability of getting from any node in Fk to any other node when percolating is a non vanishing constant qk. Then the probability of getting from a node i in one community to a node j in another community is then 1−(1−q1q2)α where α is the expected number of edges between two community and in this model is approximately α=M1M2P0. So any two communities that have strong ties will also connect weakly were the strength depends roughly on number of edges between communities.

The above analysis predicts that Ci p will have phase transitions at critical probabilities corresponding to communities, which analysis provides a local way of distinguishing communities without any global information.

Local Community Finding

A. Algorithm

The algorithm to find communities for each vertex involves sending a percolation message with percolation probability pp, forming Ci p p for a range of pp and finding the abrupt change in the community size.

1. Vertex i sends a message with percolating probability pp with a unique ID identifying iteration;
2. It records the responses and constitutes the set Si ppof the vertices responded;
3. The above task is performed k times and constitutes set Ci pp of all the vertices responding more than kth; and
4. Ci pp is computed for a range of pp and the abrupt changes in Ci p p are found at percolation probabilities of ppl defining community layer 1 with strength ppl as Ci p pl.

The above algorithm basically finds nodes with high clustering and strong ties with the source node, while diffusion algorithms try to identify edges with high betweenness and high flow of random walks to find boundaries of communities. FIG. 1 compares diffusion-based algorithms and percolation-based algorithms.

B. Advantages

Using percolation-based algorithms has many advantages over divisive and agglomerative algorithms introduced in the literature. The distributed and parallel nature of percolation search provides a means to locally explore communities for a particular node, called their structure neighborhood [16]. Often in real-world networks communities are not cohesive and have overlaps, in which case diffusion-based approaches fail since there are no separate boundaries for communities to find. The algorithm according to the present invention explores communities and identifies vertices in overlap of communities. Another property of interest in community structure is how strong a vertex belongs to a community and the level of confidence in community structure [21]. A percolation search may be shown to easily provide these statistics by observing fraction of returned messages from a particular vertex. FIG. 1 illustrates the fundamental differences between diffusion- and percolation-based approaches. For a network with n vertices and m edges, other types of community finding algorithms may find community structure in O(md log(n)) [4] where d is the depth of community dendrogram. However, one needs to process the whole graph to capture community structure of a particular node.

Community Finding

In the previous section we discussed a local and distributed algorithm to find communities of a single vertex. In this section we generalize this method to find the community structure of the graph, usually called community dendrogram. In this case the dendrogram is not a simple tree since communities may overlap.

The first approach to create community structure is to define the non-symmetric distance d(i,j) between vertices as:

$$d(i,j)=\{0,j \notin Cippl V1; \max\ m(ppm), m:j \in Cippm;$$

Then classical clustering approaches may be used on this distance matrix to find the partitioning of nodes into communities. [25].

Since the local community finding algorithm finds major communities, taking advantage of this the present invention includes a global community finding algorithm that merges the individual vertex community finding results. This algorithm has several advantages over previously proposed algorithms. It is more robust since it merges the communities over several vertices. It allows overlap of communities and purge weak and insignificant communities automatically.

Community Finding Algorithm

For each community pair (C1, C2). We then have:

$$n1,2=|\{(i,m)|(i,m) \in C1,(i,m') \in C2,\ m>0.25\ \boxed{\times}\ m1, m'>0.25\ \boxed{\times}\ m2\}|$$

$$n1=|\{(i,m)|(i,m) \in C1,(i,m') \notin C2, m>0.25\ \boxed{\times}\ m1\}|+|\{(i,m)|(i,m) \in C1,(i,m') \in C2, m>0.25\ \boxed{\times}\ m1, m' \leq 0.25\ \boxed{\times}\ m2\}|$$

$$n2=|\{(i,m)|(i,m) \notin C1,(i,m') \notin C2, m'>0.25\ \boxed{\times}\ m2\}|+|\{(i,m)|(i,m) \in C1,(i,m') \in C2,\ m<0.25\ \boxed{\times}\ m1, m'>0.25\ \boxed{\times}\ m2\}|$$

Where mi is the number of times community i has been merged. The similarity measure, ψ1,2, is then defined as (n1,2−(n1+n2))/(n1,2+(n1+n2)).

1. For each vertex i in the network perform the local community finding algorithm to get different levels of communities Ci p pl corresponding to percolation probabilities ppl. Normalize it by M=max(m)∀(j,m)εC i p pl,j≠i. Set (i,m)=(i,1).
2. Find the community pair Cl and Ck that have maximum similarity ψmax=maxi,jψi,j. if ψmax<⅓go to 3.
3. Merge community Cl, into Ck and set mk=mk+ml
4. Normalize each remaining community Ck by $$(i,m)=(i,m)\max(k,n) \in Ck\ \boxed{\times}\ (n).$$

To further benchmark an algorithm according to the present invention, the results with a number of randomly generated graphs and social and biological networks used to measure performance of previous community finding algorithms [9, 12, 15] are compared.

A. Randomly Generated Network

An algorithm according to the present invention is applied to two sets of randomly generated graphs. To benchmark the algorithm a traditional synthetic ER graph proposed in [9] is used. Then an overlap model of randomly generated graphs is used to demonstrate the advantages of proposed algorithm compared to partitioning algorithms and in particular to the fast community finding algorithm proposed in [9].

1. Random Non-Overlapping Communities.

A large number of graphs of size N=128. were generated and divided into 4 equal-sized communities of 32 vertices each. Any two vertices within the same community is connected with probability p1 and between different communities with probability p0. So that expected degree of vertices is 16. The performance of the community finding algorithm to find the communities, for different values of intra-community edges was examined. FIGS. 5A-5C show the percentage of the vertices classified correctly for a range of intercommunity edges. The results are bench-marked with similar experiments with other algorithms. FIGS. 5A-5C show that proposed algorithm works as well as a GN algorithm for small number of average inter-community edges per vertex and works considerably better for large values of inter-community edges inasmuch as the GN algorithm fails to detect communities because the number of edges inside a community and the number of edges to outside of the community is close. The algorithm according to the present invention detects communities with less precision since edges to outside of the community are randomly distributed over the network while inside edges form a clustered set of vertices that are more interconnected.

2. Random Overlapping Communities

While the previous example benchmarks performance of a community finding algorithms on random graphs, often in practical networks communities are not well separated as modeled in the previous model, but rather real life communities have overlaps, i.e. some of the nodes have strong ties to more than one community. One of the advantages of proposed algorithm due to its localized approach is that it may correctly identify overlapping communities, while traditional partitioning algorithms partition overlap vertices into one of the communities. Further enhancements of the GN algorithm propose to capture such behaviors by randomizing the partitioning steps [21].

Figure 6:
FIG. 6 illustrates how a social media site such as Facebook can predict users' next searches, based on the complete user profile and posts. This can enable such social networking sites to get search market share from Search Engines by integrating search experience into social interactions. This can have a further advantage in being able to bootstrap and provide price support for their existing advertisement network. On a user clicking on one of these search links, the user could be directed to the current sponsored search/ad feed of the social media entity.

Considering a randomly-generated graph with 128 vertices, each random vertex has 2 random edges on average. Two communities of size 37 exist where each node has on average 14 random edges inside the community. The two communities also have 5 nodes in common, as shown in FIG. 6A. Both a GN fast community finding algorithm and percolation community finding algorithm were applied. The GN method partitions the common vertices into one of the communities, as shown in FIG. 6B, while the method according to the present invention identifies communities and includes overlapping vertices in both communities, as shown in FIG. 6C. Using the method according to the present invention, seven nodes, {44, 60, 61, 77, 88, 90, 102}, are misclassified, while using the GN method 28 nodes are misclassified.

B. Zachary Karate Club

Figure 7:
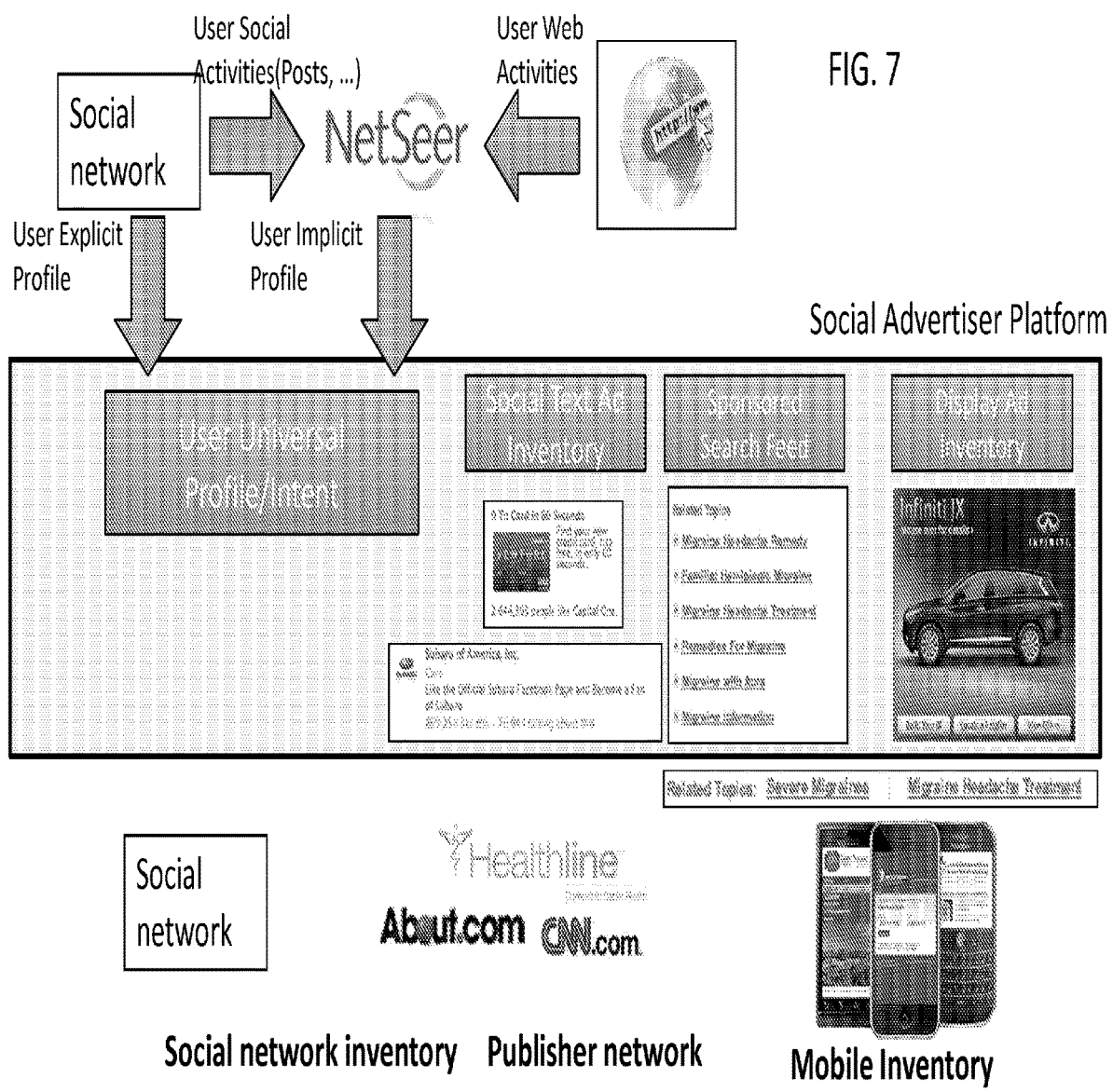
FIG. 7 illustrates a schematic of an Intent Based Display Market that could be powered by the inventions stated in this application.
Figure 9:
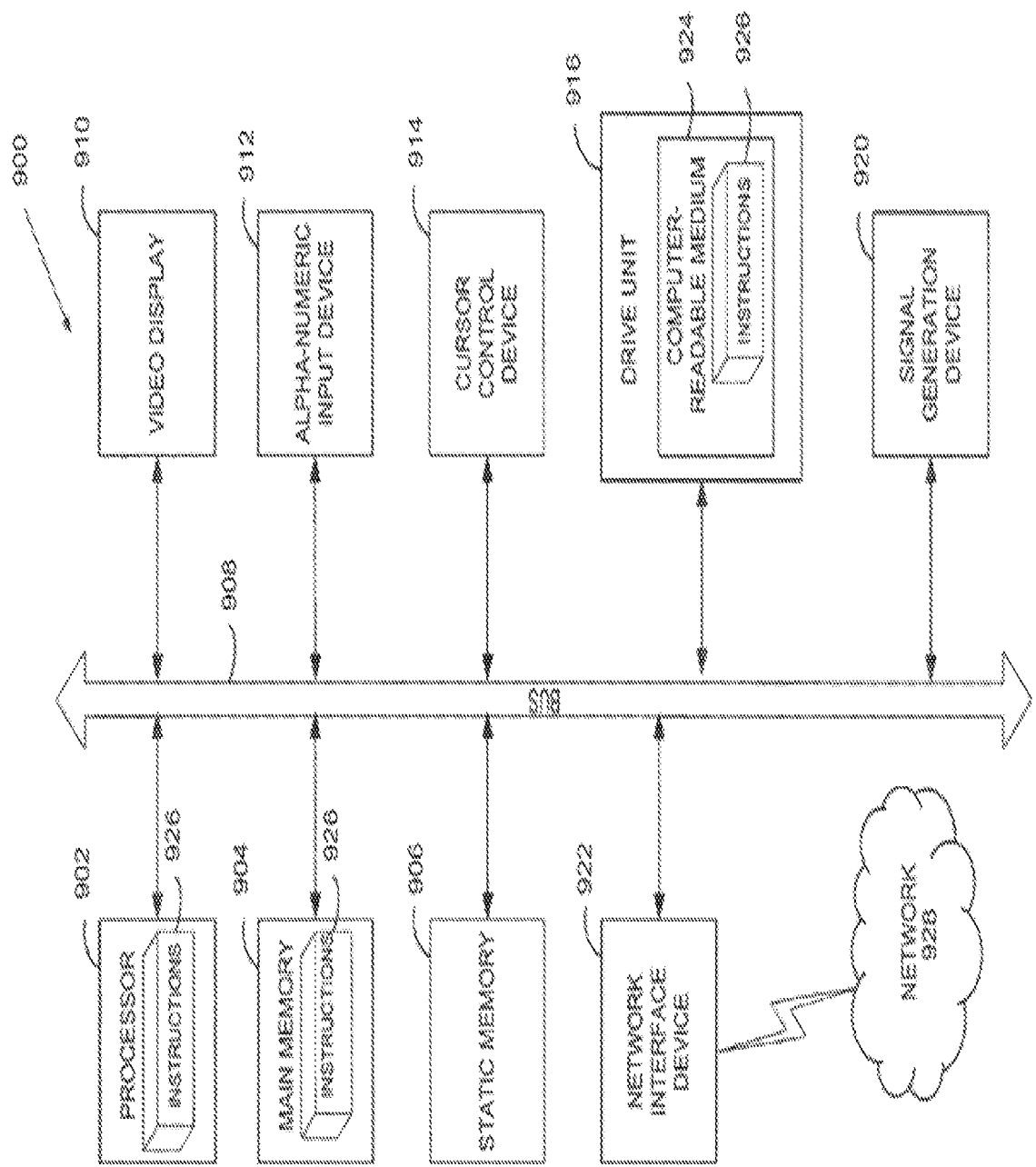
FIG. 9 is a schematic diagram of an exemplary computer system according to one embodiment of the invention.

The local community finding algorithm according to the present invention has been applied to the Zachary karate club network [22]. This undirected graph has been used extensively in previous literature [9, 12, 15] for algorithm benchmark. Zachary recorded the contacts between members of a karate club over a period of time. During the study, after a fight between owner and trainer, the club eventually split in half. The original network and the partitioning after split is depicted in FIG. 7A. The local community finding algorithm according to the present invention was applied for three important nodes in the network. Nodes 1 and 33 represent the administrator and instructor respectively, and node 34 represents a high degree node with close relations with node 33, see FIG. 7. Note that the notion of community used herein is different from that of [9] and hence the outcome is different. The algorithm according to the resent invention looks for closely connected nodes in a cluster. Identified communities clearly have overlaps. The sizes of the nodes are proportional to their strength in the community. FIG. 7B shows the local community finding for node 1. As expected, node 17 is singled out since it does not have strong ties to the community. FIG. 7C shows the local community finding result for the instructor. Node 27 has been singled out of the community since it does not have strong social connections with the community. Also, nodes 10, 25, 26, 28, 29 were singled out. FIG. 7D shows the community for node 34 and it shows that it also includes the administrator. Note that although percolation probability is symmetrical, i.e. the probability of node i and j being in the same connected component, the inclusion in the community is not symmetrical and node 34 is not included in community of node 1. The reason is that the community threshold is different for the two depending on network neighborhood. The community structure finding algorithm was also applied. Seven overlapping communities were identified. FIG. 8 shows the schematic of the relationship between detected communities. Two major communities are represented in FIG. 9. Again the sizes of the nodes represent their strengths in the community. The algorithm is able to identify the communities correctly and further identify the role and strength of each node in the community. Several nodes are clearly in the overlap between the communities as they have weak ties with both communities. As expected, nodes 1 and 34 are in the both the communities because of their close social connections with both communities, and node 12 has been excluded from the administrator community because it only has a single connection to node 1.

In the present description, a new distributed algorithm for finding communities of a vertex in a localized fashion is disclosed. It exploits social definition of a community has highly interconnected set of vertices. The algorithm according to the present invention is generalized to achieve a list of the communities for a network. It is shown how this algorithm has superior performance over previous algorithms by allowing overlap between communities and robustness to network perturbations. The algorithm may be further optimized by taking advantage of the fact that strong nodes in a community have similar local communities, and so complexity of the algorithm may be reduced by removing this computational redundancy.

Variations in the basic algorithm include:
1. Starting from a set of seed nodes instead of a single node
2. Instead of defining a global and uniform percolation probability, each node i is assigned a weight between 0 and 1 as Wi. Each edge between nodes i and j may also be assigned a weight between 0 to 1 as Wij. Then each node instead of passing the message with Percolation probability Pperc it passes the message with a probability as a function of $f(Pperc,Wi,Wij)$ for example it may be PPerc*Wi*Wi,j
3. Nodes and links may have different types and each type may have a predefined weights.
4. Weights of different links may be trained and adjusted for a particular user depending on the usage pattern or concept. For example, for a user searching for biotechnology, weight of the nodes in other concepts like food industry could be reduced
5. Sweeping over percolation probability may be optimized by doing a quick search over this metric.
6. Result of the community findings may be used to adjust link and node weights The present invention has a broad scope of applicability to almost any collection of data. FIG. 10A depicts a generalized system flowchart of a generalized process according to the present invention. The flowchart includes forming the network, assigning different weights, and performing local community finding on the network. This process is refined by feedback to adjust weights and modify nodes based on query, community results and/or user feedback. FIG. 10B illustrates a system architecture reference model; The system includes different layers. Meta-data is imported from various operational information databases and is organized and processed into a meta-data repository. Different information retrieval components are used to analyze the data for particular applications. Customer and web services access an enterprise portal network with general interfaces to make queries and receive results processed by an information retrieval framework and refined information presentation framework. FIG. 10C illustrates a core architectural model according to the present invention wherein a meta-data repository consists of analyzed linked storage of different types of data as discussed with respect to the system architecture. Different plug-ins may be used to interact with structural analysis engines to answer queries. A standard command/report API is used to access the system through web services.

It may be applied to documents, such as papers, patents, FDA clinical trials documents, product descriptions, news reports, market analyses, analyst reports, business reporting information, and any combination or permutation thereof. It may also be employed in applications for analysis of the World Wide Web, Email and spam filtering. The present invention may also be applied to pattern detection in biological networks, such as transcription regulatory networks, social networks and communities, for example for military and homeland security applications.

In a patent: finding landscape, the present invention may be used to analyze competitors and to monitor those competitors with a watchdog capability by flagging results of ongoing analyses of companies, concepts, and technologies. FIG. 11A illustrates a system flowchart for application to patent information. The results are refined by feeding back the user adjustments of results to a meta-data repository. FIG. 11B shows transaction flows prior to application of an algorithm according to the present invention. FIG. 11C shows transaction flow with application to landscape analysis of patents using an algorithm according to the present invention.

The present invention also enables a user to browse through communities and fine-tune the results with a simple binary filter. In application to market analysis, the present invention may be used to provide a portfolio for different sections of the market in terms of competitors, technologies, latest news and technical papers and publications. Gaps between communities, and hence opportunities not covered by competitors, may be discovered by examining inter-community relations.

The present invention may be used to find the web neighborhood of a website, its impact and links and communities on the web. It may also be used to monitor the neighborhood change over time. The present invention also provides an email and spam filter. by providing a method to reduce spam and deliver messages only from the people relevant to an address.

Recently the problem of unsolicited commercial email or spam has been identified as an ubiquitous problem with email. The present invention provides a more general framework of cybertrust which not only provides a solution to the spam problem, but also restricts email access to trusted individuals. A new distributed method may be based on percolation theory for identifying individual users local network trust in cyberspace using simple local interactions. Recommendation and social connections are used in daily activities to identify trust and reliability. Adopting the same social approach, percolative communication of email messages and limiting interactions to social contacts restricts communication to locally trusted overlapping of communities. The method according to the present invention further exploits the properties of social networks to construct a distributed web of trust based on a user's personal email network to simultaneously prevent spam emails and emails from unwanted sources. The algorithm represents a new paradigm for email communication that proves superior to simple white-list/black-list approaches.

The problem is not just spam, the problem is the user receiving email from the people the user doesn't know. Many people simply discard an email if it is not from their contact list or unless somebody introduces them through an email (CC). This notion of online recommendation may be generalized according to the present invention and made invisible and intuitive. The method according to the present invention may be combined with Bayesian and text based filters.

Behind the implementing algorithm is the present invention of applying percolation to overlapping communities for a user. The header of the email is changed so that it includes current receiver (To) and final destination (Final-To). Then upon receiving an email, if the final destination is the user, it is delivered to the user's inbox else if Current destination is me and time to live of email is less than some threshold I forward it to people in my contact list with forwarding probability P. This probability is chosen by user and can define how the limited a user wants to define its email community.

---

Algorithm 1 PROCESS-MAIL(Email E)

```
1:  if E.F ROM is not in Contact list then
2:    Put E in (High-Probability-Spam)
3:  else
4:    if E.FinalTO = MyAddress then
5:      Put E in INBOX
6:    else
7:      if TTL<Threshold then
8:        for all ContactAddress in ContactList do
9:          RandomVal = RANDOM-GEN01( );
10:         if RandomVal < ForwardingProbability then
11:           SENDMAIL(FinalTo:E.FinalTo,
                  From:MyAddress,
                  To:ContactAddress)
12:         end if
13:       end for
14:     end if
15:   end if
16: end if
contacts.
```

---

Where SENDMAIL(FinalTo, From,To) sends an email with a proper header for TO, FROM and FinalTo.

The algorithm according to the present invention may be implemented in a distributed fashion, or in a centralized fashion by emulating it in the mail server for large email providers. In one variation according to the present invention, the forwarding probability may be weighted as a function of the email traffic between a sender and the user.

For social networks, including dating and recreational activities, the present invention may be used to identify communities and relationship between communities using social interactions data and to find the best social connection with a group of people.

With respect to biological networks like transcription regulatory networks, the present invention may be used to discover functional blueprints of a cellular system from large-scale and high-throughput sequence and experimental data and allowing complex intracellular processes. to be revealed. See http://arxiv.org/abs/q-bio.MN/0501039). The present invention may be used to mine genomic data and other data to correlate functional and structural with sequence data, for example. Also according to the present invention, literature, patent, patient history, drug trial and other data may be mined to assist in providing diagnosis or prognosis for a disease in a patient.

Patterns and communities may be revealed by applying the present invention to homeland security data: Finding certain patterns of groups and behaviors related to homeland security, communities with certain relevant characteristics may be identified.

The user activities and data processed in embodiments of the invention include, but not limited to, structured data, e.g. email-id, phone number, geo-location, friends/links, etc., as well as, unstructured data—e.g. searches, web-browsing (both on and off the social media properties), posts, comments, content of web pages that receive Likes or Links etc. The user intent and profiles extracted in embodiments of the invention are captured and expressed in terms of weighted sub-graphs of a collective/global concept graph. The collective/global concept graph includes nodes that are concepts, and edges that are relationships among such concepts. Concepts in embodiments of the invention include, but not limited to, phrases that represent entities (e.g. people, companies, drugs, diets, films, shows, events etc.), domain-specific terms (e.g., sports and medical terminologies, specific treatments, procedures etc.), or common expressions that are used to convey information. Relationships, as captured by annotated edges among concepts, include, but not limited to, measures of closeness among the concepts, e.g., co-occurrence statistics, or explicit semantic relationships (e.g., "acted in", "father of", "part of" etc.).

In some embodiments of the invention, the user intent profiles are determined and generated using weighted clusters and sub-graphs of the global concept graph. Furthermore, the user intent profiles can be tagged with temporal data. For example, certain subsets of a user's profile could be considered recent and time-sensitive (e.g., in the market to buy a product or go on a trip), whereas, other aspects of user's profile could be longer lasting (e.g., regions of the concept graph that represent an antique aficionado or a diabetes patient).

Similarly, one of the parameters in computing the weights in the sub-graph (representing a user's profile) can be based on how many of his/her friends also share the same nodes or edges. The group or collective activities of users at the social media site can be further used to tag and prioritize both the unstructured data used to extract the user profile, as well as, the distilled user profile. For example, in one embodiment of the invention, pages and content sites are grouped based on communal user actions, such as Likes or posts made to the page/site; thus, pages/sites belonging to the same group have been all visited/liked by a distinct group of users. Such a group of content sites and pages can then be collectively analyzed to create a collective content profile (again in terms of the global concept graph), which can then be used to tag the corresponding users.

In yet another embodiment of this invention, a user profile is post-processed and tagged with weighted category scores defined over a structured taxonomy of interest. For example, in one embodiment, a standard taxonomy used by the advertisement industry can be used to categorize the user profile (i.e., the sub-graph of the concept graph) in terms of the various categories in the taxonomy and compute a score for each such category. Since a number of advertisers define their campaigns based on categories, rather than the finer specificity of concept graphs, such coarse-grained tagging of user profiles can be used to more easily and directly match advertisements to users.

The advertisers, in embodiments of the invention, include but are not limited to, entities that carry out display and brand advertisement campaigns or perform search keyword auctions, or are lead-generators who aggregate demand across different platforms and media for merchants. Embodiments of the invention also allows one to assign each such advertiser a set of advertiser target profiles, which again could be expressed as (i) weighted and time-tagged sub-graphs of the global concept graph or (ii) a weighted list of categories picked from a certain structured taxonomy. Such advertiser target profiles serve the same purpose as user intent profiles. In other words, the advertiser target profiles provide a description of their target audience in terms of a common and globally-shared database, which is the concept graph. The act of targeting advertisement includes, but not limited to, determining for each user a weighted and prioritized list of advertisers that best match the user intent. One method for matching user intent to an advertiser is based upon computing the overlap or distance between the user intent profile and the advertiser target profile, e.g., by computing a measure of the distance (e.g. weighted shortest paths, or sum of the weights of the shared edges) between the two corresponding weighted sub-graphs in the global concept graph. The selection of the final set of advertisement units is completed by an optimization process that maximizes objective functions of interest, including revenue for the social media site, value and Return-On-Investment (ROI) for the advertisers, while considering the device and media that the user is on at the time of the impression. For example, in one embodiment of the invention, contextually relevant search-suggestions (i.e., keywords feed from a search engine) may be provided to users while they are engaged in a particular conversation on the social media site. In another embodiment of the invention, contextually relevant text or display ads are targeted to a user while the user is browsing a third-party web page (i.e., a web page not owned by the social media site). In yet another embodiment, an advertisement (both display and text units) is provided to a user on a mobile device by targeting the user profile.

In embodiments of the invention, user profiles and the underlying concept graph are used to enhance user engagement at a social media site. Such user engagement enhancement includes, but not limited to, (i) organizing friends or contact lists of a user into potentially overlapping groups, by computing similarity between a user's profile and the profiles of those of his friends and contacts. An active user working in the finance sector, for example, will have a lot of activities on the social media site (or activities visible from the site), such as searches or browsing history, related to finance and investment concepts; these concepts would be shared with his friends/contacts from the finance sector, leading to overlaps in their intent profiles and allowing the invention to define a common profile and a group comprising these individuals. Typically, a user has friends that are from different contexts of one's life, e.g., work related, hobby related, high-school friends, college friends etc. and the invention provides a method for identifying and labeling these groups in an automated fashion. (ii) Organizing posts, comments and social interactions between a user and his friends in terms of the underlying context. For example, the linear and a long list of posts on wall or the home page of a social media site can be organized into different subjects and categories by automatically classifying them into categories such as sports, sports teams, travel etc. by mapping them into the concept graph. This will also enable one to determine the dominant types of social interactions that happen among friends, which can then be used for targeting advertisement. For example, if posts from a particular friend have a predominant theme of electronic gadgets (as determined by the invention's automated classification method), and he then recommends/likes a new phone, then such a recommendation would have a lot higher relevance than that coming from a cooking-enthusiast.

The user activities and data processed in embodiments of the invention include, but are not limited to, structured data, e.g. email-id, phone number, geo-location, friends/links, etc., as well as, unstructured data—e.g. searches, web-browsing (both on and off the social media properties), posts, comments, content of web pages that receive Likes or Links etc. For example, some of the data would include:
1. User activities exclusively on the Social Media Site:
  a. Post Likes
  b. Page and Group Likes
  c. Posts d. Subscriptions
2. User activities involving the rest of the Internet:
  a. Incoming likes, sharing, recommendation coming from WEB through for example, social-site's plugin on publisher sites
  b. Searches
3. Social graph and connections These data sources are processed to extract user intent and profiles in terms of weighted sub-graphs of a collective/global concept graph, comprising nodes that are concepts, and edges that are relationships among such concepts. Concepts in embodiments of the invention include, but not limited to, phrases that represent entities (e.g. people, companies, drugs, diets, films, shows, events etc.), domain-specific terms (e.g., sports and medical terminologies, specific treatments, procedures etc.), or common expressions that are used to convey information. Relationships, as captured by annotated edges among concepts, include, but not limited to, measures of closeness among the concepts, e.g., co-occurrence statistics, or explicit semantic relationships (e.g., "acted in", "father of", "part of" etc.). For the purpose of demonstrating the invention, an exemplary concept graph can be used to capture and represent user profiles. The global concept graph is constructed by using the structure of the web (analyzing trillions of words) and an embodiment of it comprises of over 50 million concepts and 2 billion relationships, as disclosed, for example, in U.S. Pat. No. 7,958, 120 and co-pending U.S. patent application Ser. No. 11/625, 279, entitled "SYSTEMS AND METHODS FOR CREATING, NAVIGATING, AND SEARCHING INFORMATIONAL WEB NEIGHBORHOODS", U.S. patent application Ser. No. 12/436,748, entitled "METHODS AND APPARATUS FOR DISCOVERING RELEVANT CONCEPT AND CONTEXT FOR CONTENT SPECIFIC NODE", and U.S. patent application Ser. No. 12/906,051, "GENERATING A CONCEPTUAL ASSOCIATION GRAPH FROM LARGE-SCALE LOOSELY-GROUPED CONTENT", the entireties of which are hereby incorporated by reference. FIG. 1 shows a sub-graph of the global concept graph for the concept "Diabetes".

Figure 2B:
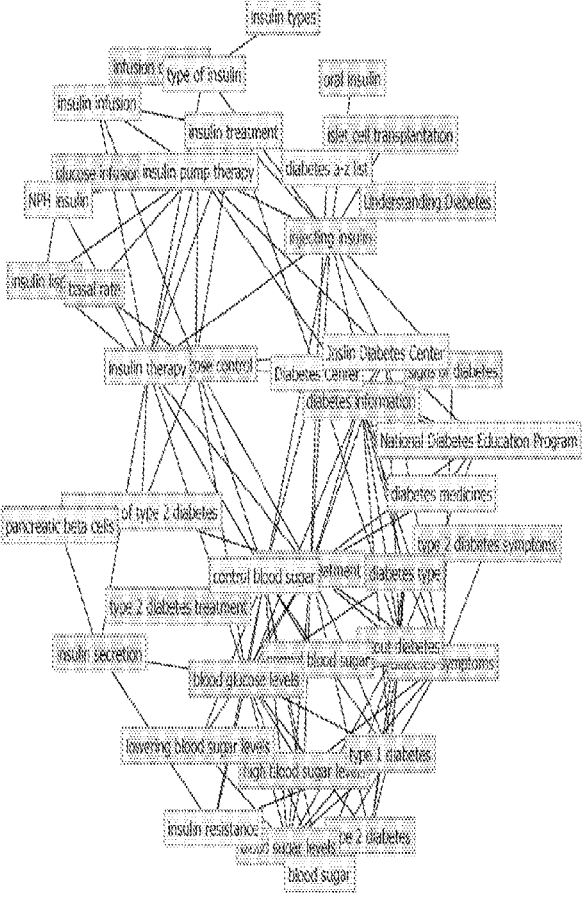
Figure 3B:
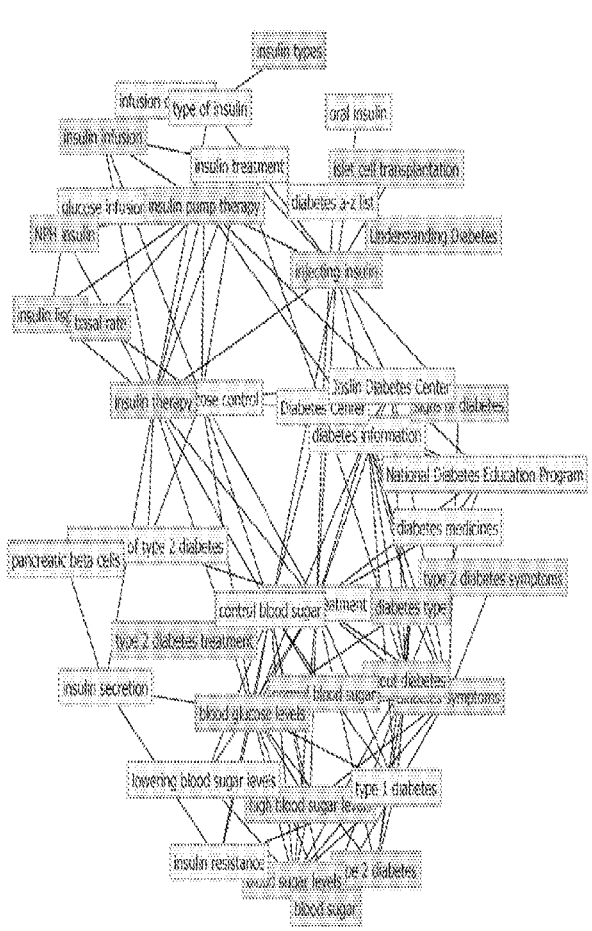

In embodiments of the invention, a sequence of page views and search activities can be followed on the concept graph and can be used to distill a subgraph that represents the intent as expressed by the sequence of page views. This is represented, for example, in FIGS. 2-4, where a User "31b23njh31abcds23j2h123213" visited webMD on 2012-08-01 5:31 pm (FIG. 2A), then the same user visited healthline on 2012-08-04 9:31 am (FIG. 3A), and then searched on Google on 2012 Aug. 4 9:31 pm (FIG. 4A). All three activities are tracked as group of concepts in the same neighborhood around the concept "Diabetes" in the underlying concept graph (FIGS. 2B, 3B and 4B).

FIGS. 5A-5C illustrate an example of a user profile based on content data that is typically found on a social media site: A Mr. X that is diabetic, enjoys or interested in sailing and in Rolex watches.

The data is processed to generate such profiles (i.e., the posts, page content, etc. that is processed for content). The data is selected based on a number of social media signals. The data includes, for example, Post Likes, Page and Group Likes, pages viewed/browsed on and off the social media site. The group or collective activities of users at the social media site can be further used to tag and prioritize both the unstructured data used to extract the user profile, as well as, the distilled user profile. For example, in one embodiment of the invention, pages and content sites are grouped based on communal user actions, such as Likes or posts made to the page/site. Thus, pages/sites/Groups can be divided into clusters, such that pages/sites belonging to the same clusters have been all visited/liked by a distinct group of users. Such a cluster of content sites and pages and Groups can then be collectively analyzed to create a collective content profile (again in terms of the global concept graph), which can then be used to tag the corresponding users. Moreover, usual page and domain statistics, such as page-rank and com-score ratings can be used to prioritize.

Furthermore, the user intent profiles (which include weighted clusters and sub-graphs of the global concept graph) can be tagged with temporal data, for example, certain subsets of a user's profile can be considered recent and time-sensitive (e.g., in the market to buy a product or go on a trip), whereas other aspects of user's profile could be longer lasting (e.g., regions of the concept graph that represent an antique aficionado or a diabetes patient). Similarly, one of the parameters for computing the weights in the sub-graph (representing a user's profile) can be based on how many of his/her friends also share the same nodes or edges. In yet another embodiment of this invention, a user profile is post-processed and tagged with weighted category scores defined over a structured taxonomy of interest. For example, a standard taxonomy can be used by the advertisement industry, and then be used to categorize the user profile (i.e., the sub-graph of the concept graph) in terms of the various categories in the taxonomy and compute a score for each such category. Since a number of advertisers define their campaigns based on categories, rather than the finer specificity of concept graphs, such coarse-grained tagging of user profiles can be used to more easily and directly match advertisements to users.

The user intent profiles then can be used to, for example, target the right advertisement to the right user at the right moment. The advertisers, in embodiments of the invention, include but not limited to, entities that carry out display and brand advertisement campaigns or perform search keyword auctions, or are lead-generators who aggregate demand across different platforms and media for merchants. Embodiments of the invention relate to assignment of a set of advertiser target profiles to each such advertiser, which again could be expressed as (i) weighted and time-tagged sub-graphs of the global concept graph or (ii) a weighted list of categories picked from a certain structured taxonomy. Such advertiser target profiles serve the same purpose as user intent profiles, i.e., provide a description of their target audience in terms of a common and globally-shared database, which is the concept graph. The act of targeting advertisement includes, but not limited to, determining for each user a weighted and prioritized list of advertisers that best match the user intent. One method for matching user intent to an advertiser is based upon computing the overlap or distance between the user intent profile and the advertiser target profile, e.g., by computing a measure of the distance (e.g. weighted shortest paths, or sum of the weights of the shared edges) between the two corresponding weighted sub-graphs in the global concept graph. The selection of the final set of advertisement units is completed by an optimization process that maximizes objective functions of interest, including revenue for the social media site, value and Return-On-Investment (ROI) for the advertisers, while considering the device and media that the user is on at the time of the impression.

For example, in one embodiment described in this invention, contextually relevant search-suggestions (i.e., keywords feed from a search engine) are shown to users while they are engaged in a particular conversation on the social media site.

In another embodiment of the invention, contextually relevant text or display advertisements are targeted to a user while browsing a third-party web page (i.e., a web page not owned by the social media site). Yet another embodiment teaches how to show advertisement (both display and text units) to a user on a mobile device by targeting user profile.

Embodiments of the invention are also directed to use of user profiles and the underlying concept graph to enhance user engagement at a social media site. Such user engagement enhancement includes, but is not limited to, (i) organizing friends or contact lists of a user into potentially overlapping groups, by computing similarity between a user's profile and the profiles of those of his friends and contacts. An active user working in the finance sector, for example, will have a lot of activities on the social media site (or activities visible from the site), such as searches or browsing history, related to finance and investment concepts; these concepts would be shared with his friends/contacts from the finance sector, leading to overlaps in their intent profiles and allowing the invention to define a common profile and a group comprising these individuals. Typically, a user has friends that are from different contexts of one's life, e.g., work related, hobby related, high-school friends, college friends etc. and the invention provides a method for identifying and labeling these groups in an automated fashion. (ii) Organizing posts, comments and social interactions between a user and his friends in terms of the underlying context. For example, the linear and a long list of posts on wall or the home page of a social media site can be organized into different subjects and categories by automatically classifying them into categories such as sports, sports teams, travel etc. by mapping them into the concept graph.

This enables determination of the dominant types of social interactions that happen among friends, which can then be used for targeting advertisement. For example, if posts from a particular friend have a predominant theme of electronic gadgets (as determined by the invention's automated classification method), and he then recommends/likes a new phone, then such a recommendation would have a lot higher relevance than that coming from a cooking-enthusiast.

Embodiments of the invention are also directed to a Temporal Commercial Intent Profile (Collective Retargeting) that can be used to target advertisement and create commercially useful user intent profiles in a computationally efficient way from large-scale user data.

The goal is to generate a profile for each user that shows the level of urgency and interest in each of the standard commercial verticals. So, this can be used as an important factor in placement score of an ad on a page based on the cross relevancy of the page and ad to the top verticals of interests.

Output:

For each user we generate a scored version of a list, which is the standard targeting vertical used in the advertisement industry. Since this list is a standard, it makes it very easy to match against intention of the advertiser when we have such a profile for users.

Score could be separated into two parts as well:
1—Urgency (time factor)
2—Interest (has generic interest factor regardless of time as well)

Example: It is winter time and Mr. X is interested in Travel>Tourist Destinations>Mountain & Ski Resorts, the score of this vertical for my profile should only last until the season lasts and I'm still interested in taking or retaking such a trip based on my activities.

Inputs:
1. Internal user activities:
a. Posts and Likes
b. Pages and groups Likes
c. Posts
d. Subscriptions
2. External activities:
a. Incoming likes, sharing, recommendation coming from WEB through for example FaceBook social-plugin on publisher sites
3. Social graph and connections
4. Using social-plugin visits (not actions) as a retargeting pixel
5. Concept Graph and all the related meta data Besides being able to process content accurately, the main challenge would be filtering out large percentage of the collective data and only stick to the part which has relevant commercial intent hidden in it. For example if Mr. X has liked a page related to a poet, months back, that should be considered with a very low commercial intent.

Exemplary Implementations:

Add commercial intent score to concepts; this could be done using third party data, so we will have a DB of <CONCEPT,SCORED VERTICALS>. This db should be temporal as well, and we need to find a good trending method to keep this db updated. For example, Shopping>Toys should be boosted at Christmas time, or News>Politics should be boosted around election times.

Join <VISITED EXTERNAL URL,CONCEPTS> to <CONCEPT,SCORED VERTICALS> and create <URL, SCORED VERTICALS> Join <USERS,VISITED EXTERNAL URL> to <URL,SCORED VERTICALS> and create <USERS,SCORED VERTICALS BASED ON EXTERNAL PAGES> Do the same and join <FB PAGE,CONCEPT> to <CONCEPT,SCORED VERTICALS> and create <FB PAGE,SCORED VERTICALS> Join <USERS, POSTS> to <POSTS,CONCEPTS> and create <USERS, CONCEPTS> Join <USERS, CONCEPTS> to <CONCEPT,SCORED VERTICALS> and create <USERS, SCORED VERTICALS BASED ON POSTS> Join <USERS, FB PAGES> to <CONCEPT,SCORED VERTICALS> and create <USERS,SCORED VERTICALS BASED ON FB PAGES>

We can use the social graph and cross correlation (overlap of users) on different FB pages to boost up or filter out any of the above data. The aggregation scoring can be done based above steps.

At the end of this process, we get mapping of <USER, AGGREGATED SCORED VERTICALS> which can then used to target advertisement as illustrated in FIG. 7.

FIG. 9 shows a diagrammatic representation of machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 902 (e.g., a central processing unit (CPU), a graphics processing unit (GPU) or both), a main memory 904 (e.g., read only memory (ROM), flash memory, dynamic random access memory (DRAM) such as synchronous DRAM (SDRAM) or Rambus DRAM (RDRAM), etc.) and a static memory 906 (e.g., flash memory, static random access memory (SRAM), etc.), which communicate with each other via a bus 908.

The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a disk drive unit 916, a signal generation device 920 (e.g., a speaker) and a network interface device 922.

The disk drive unit 916 includes a computer-readable medium 924 on which is stored one or more sets of instructions (e.g., software 926) embodying any one or more of the methodologies or functions described herein. The software 926 may also reside, completely or at least partially, within the main memory 904 and/or within the processor 902 during execution thereof by the computer system 900, the main memory 904 and the processor 902 also constituting computer-readable media.

The software 926 may further be transmitted or received over a network 928 via the network interface device 922.

While the computer-readable medium 924 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present invention. The term "computer-readable medium" shall accordingly be taken to include, but not be limited to, solid-state memories, and optical and magnetic media.

One or more of the methodologies or functions described herein may be embodied in a computer-readable medium on which is stored one or more sets of instructions (e.g., software). The software may reside, completely or at least partially, within memory and/or within a processor during execution thereof. The software may further be transmitted or received over a network.

It should be noted that the intent profile extraction systems, methods and applications are illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

It should be noted that the invention is illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

The term "computer-readable medium" should be taken to include a single medium or multiple media that store the one or more sets of instructions. The term "computer-readable medium" shall also be taken to include any medium that is capable of storing, encoding or carrying a set of instructions for execution by a machine and that cause a machine to perform any one or more of the methodologies of the present invention. The term "computer-readable medium" shall accordingly be taken to include, but not be limited to, solid-state memories, and optical and magnetic media.

Embodiments of the invention have been described through functional modules at times, which are defined by executable instructions recorded on computer readable media which cause a computer, microprocessors or chipsets to perform method steps when executed. The modules have been segregated by function for the sake of clarity. However, it should be understood that the modules need not correspond to discreet blocks of code and the described functions can be carried out by the execution of various code portions stored on various media and executed at various times.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The invention has been described in relation to particular examples, which are intended in all respects to be illustrative rather than restrictive. Those skilled in the art will appreciate that many different combinations of hardware, software, and firmware will be suitable for practicing the present invention. Various aspects and/or components of the described embodiments may be used singly or in any combination. It is intended that the specification and examples be considered as exemplary only, with a true scope and spirit of the invention being indicated by the claims.

The invention claimed is:

1. A computer-implemented method comprising:
identifying, via a processor, structured user data from a social media site, the structured user data comprising an email identification, phone number, geo-location, friends and links;
identifying, via the processor, user activities on the social media site;
identifying, via the processor, incoming likes, sharing, recommendations on the social media site;
identifying, via the processor, connections of the user;
obtaining a global concept graph comprising nodes that are concepts, and edges that are relationships among such concepts, wherein the concepts comprise phrases that represent entities, domain-specific terms and common expressions that are used to convey information;
wherein the relationships are identified by annotated edges among concepts, wherein the relationships comprise measures of closeness among the concepts;
obtaining at least one weighted sub-graph of the global concept graph using the structured user data; the user activities on the social media site; the user activities not involving the social media site; the incoming likes, sharing, and recommendations on the social media site; user searches that do not involve the social media site; and the connections of the user;
obtaining an intent profile of the user from information in the weighted sub-graph(s); and
matching the intent profile with an advertiser profile to target an advertisement to the user.

2. The method of claim 1 further comprising identifying, via the processor, user activities involving the Internet that do not involve the social media site.

3. The method of claim 1 further comprising:
generating a score for each vertical in a targeting vertical list.

4. The method of claim 3, wherein the score comprises a time factor and an interest factor.

5. The method of claim 3, wherein the score is generated based on user activities on the social media site, user activities involving the Internet, incoming likes, sharing, recommendation on the social media site, and user searches.

6. The method of claim 1 further comprising modifying a user experience of the user by organizing a contact list of the user and conversations and posts of the user based on their content and conceptual context.

7. The method of claim 6, further comprising performing an aggregation scoring.

8. The method of claim 1, wherein the concepts are selected from the group consisting of people, companies, drugs, diets, films, shows, events, wherein the domain-specific terms are selected from the group consisting of sports and medical terminologies, specific treatments, and procedures.

9. The method of claim 1, further comprising tagging the intent profile of the user with temporal data.

10. The method of claim 1, further comprising:
tagging unstructured data using collective activities of users at the social media site, wherein the unstructured data is selected from searches, we-browsing, posts, comments, content of web pages that received likes and links.

11. The method of claim 1, further comprising prioritizing unstructured data using collective activities of users at the social media site.

12. The method of claim 1, further comprising post-processing and tagging the intent profile of the user with weighted category scores defined over a structured taxonomy of interest.

13. The method of claim 1, further comprising assigning at least one advertiser a set of advertiser target profiles.

14. The method of claim 13, wherein each of the advertiser target profiles comprises a weighted list of categories picked from a structured taxonomy.

15. The method of claim 1, wherein selecting a final set of advertisement units is completed by an optimization process that maximizes objective functions of interest, including revenue for the social media site, value and Return-On-Investment (ROI) for advertisers, while considering a device and media of the user.

16. The method of claim 6, wherein modifying a user experience comprises organizing friends or contact lists of the user into potentially overlapping groups by computing similarity between a user's profile and the profiles of those of his friends and contacts.

17. The method of claim 16, wherein organizing friends or contact lists of a user into potentially overlapping groups comprise computing similarity between a user's profile and the profiles of those of the user's friends and contacts.

18. The method of claim 6, wherein modifying a user engagement comprises organizing posts, comments and social interactions between a user and his friends based on an underlying context.

19. A non-transitory computer readable medium comprising instructions, that when read by a processor, cause the processor to perform:
Identifying structured user data from a social media site, the structured user data comprising an email identification, phone number, geo-location, friends and links;
Identifying user activities on the social media site;
Identifying incoming likes, sharing, recommendations on the social media site;
Identifying connections of the user;
obtaining a global concept graph comprising nodes that are concepts, and edges that are relationships among such concepts, wherein the concepts comprise phrases that represent entities, domain-specific terms and common expressions that are used to convey information;
wherein the relationships are identified by annotated edges among concepts, wherein the relationships comprise measures of closeness among the concepts;
obtaining at least one weighted sub-graph of the global concept graph using the structured user data; the user activities on the social media site; the user activities not involving the social media site; the incoming likes, sharing, and recommendations on the social media site; user searches that do not involve the social media site; and the connections of the user;
obtaining an intent profile of the user from information in the weighted sub-graph(s); and
matching the intent profile with an advertiser profile to target an advertisement to the user.

20. A system comprising:
a processor; and
memory communicably coupled to the processor;
wherein the processor:

identifies structured user data from a social media site, the structured user data comprising an email identification, phone number, geo-location, friends and links;

identifies user activities on the social media site;

identifies incoming likes, sharing, recommendations on the social media site;

identifies connections of the user;

obtains a global concept graph comprising nodes that are concepts, and edges that are relationships among such concepts, wherein the concepts comprise phrases that represent entities, domain-specific terms and common expressions that are used to convey information;

wherein the relationships are identified by annotated edges among concepts, wherein the relationships comprise measures of closeness among the concepts;

obtains at least one weighted sub-graph of the global concept graph using the structured user data; the user activities on the social media site; the user activities not involving the social media site; the incoming likes, sharing, and recommendations on the social media site; user searches that do not involve the social media site; and the connections of the user;

obtains an intent profile of the user from information in the weighted sub-graph(s); and matches the intent profile with an advertiser profile to target an advertisement to the user.

* * * * *